(12) United States Patent
Kim et al.

(10) Patent No.: US 11,316,199 B2
(45) Date of Patent: Apr. 26, 2022

(54) RECHARGEABLE METAL HALIDE BATTERY

(71) Applicant: International Business Machines Corporation, Armonk, NY (US)

(72) Inventors: Jangwoo Kim, San Jose, CA (US); Young-Hye Na, San Jose, CA (US); Ho-Cheol Kim, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 392 days.

(21) Appl. No.: 15/872,607

(22) Filed: Jan. 16, 2018

(65) Prior Publication Data
US 2019/0221887 A1 Jul. 18, 2019

(51) Int. Cl.
| | |
|---|---|
| *H01M 4/36* | (2006.01) |
| *H01M 10/0525* | (2010.01) |
| *H01M 10/0568* | (2010.01) |
| *H01M 10/0569* | (2010.01) |
| *H01M 10/0567* | (2010.01) |
| *H01M 10/0562* | (2010.01) |
| *H01M 4/134* | (2010.01) |
| *H01M 4/38* | (2006.01) |
| *H01M 10/054* | (2010.01) |
| *H01M 4/02* | (2006.01) |

(52) U.S. Cl.
CPC ....... *H01M 10/0568* (2013.01); *H01M 4/134* (2013.01); *H01M 4/38* (2013.01); *H01M 4/382* (2013.01); *H01M 10/054* (2013.01); *H01M 10/0525* (2013.01); *H01M 10/0562* (2013.01); *H01M 10/0567* (2013.01); *H01M 10/0569* (2013.01); *H01M 2004/027* (2013.01); *H01M 2220/10* (2013.01); *H01M 2220/20* (2013.01); *H01M 2300/0034* (2013.01)

(58) Field of Classification Search
CPC ...................................................... H01M 12/06
See application file for complete search history.

(56) References Cited

U.S. PATENT DOCUMENTS

| | | | | | |
|---|---|---|---|---|---|
| 3,540,934 | A | * | 11/1970 | Boeke | H01M 8/20 429/409 |
| 3,994,745 | A | * | 11/1976 | Ludwig | H01M 8/184 429/81 |
| 4,020,246 | A | * | 4/1977 | Seo | H01M 6/14 429/104 |

(Continued)

FOREIGN PATENT DOCUMENTS

| | | |
|---|---|---|
| CN | 105579125 A | 5/2016 |
| CN | 106207191 A | 12/2016 |

(Continued)

OTHER PUBLICATIONS

International Search Report and Written Opinion of International Application No. PCT/IB2019/050094, dated Apr. 17, 2019, 8 pp.

(Continued)

*Primary Examiner* — Bach T Dinh
(74) *Attorney, Agent, or Firm* — H. Sanders Gwin, Jr.; Karen Canaan; CanaanLaw, P.C.

(57) ABSTRACT

A battery includes an anode; an electrolyte including an oxidizing gas; a metal halide that functions as an active cathode material; and a solvent including a nitrile compound; and a current collector contacting the cathode material.

20 Claims, 19 Drawing Sheets

(56) References Cited

U.S. PATENT DOCUMENTS

| | | | | |
|---|---|---|---|---|
| 5,510,209 | A * | 4/1996 | Abraham | H01M 4/381 |
| | | | | 429/310 |
| 9,437,902 | B2 | 9/2016 | Onizuka | |
| 9,461,349 | B2 | 10/2016 | Mizuno et al. | |
| 9,893,383 | B2 | 2/2018 | Raub et al. | |
| 9,911,981 | B1 * | 3/2018 | Kane | H01M 12/00 |
| 2004/0009390 | A1 * | 1/2004 | Roy | H01M 4/8621 |
| | | | | 429/464 |
| 2010/0273066 | A1 * | 10/2010 | Flanagan | H01M 12/08 |
| | | | | 429/338 |
| 2012/0270116 | A1 | 10/2012 | Cho et al. | |
| 2012/0321911 | A1 | 12/2012 | Watanabe et al. | |
| 2013/0089795 | A1 * | 4/2013 | Chase | H01M 4/0471 |
| | | | | 429/405 |
| 2013/0224535 | A1 | 8/2013 | Matsuoka et al. | |
| 2013/0280624 | A1 * | 10/2013 | Lohmann | H01M 4/8673 |
| | | | | 429/405 |
| 2014/0065456 | A1 * | 3/2014 | Bhavaraju | H01M 12/08 |
| | | | | 429/105 |
| 2014/0255802 | A1 * | 9/2014 | Barde | H01M 12/06 |
| | | | | 429/405 |
| 2016/0248115 | A1 | 8/2016 | Hatta et al. | |
| 2016/0315345 | A1 * | 10/2016 | Kim | H01M 4/582 |

FOREIGN PATENT DOCUMENTS

| | | |
|---|---|---|
| JP | 2011222473 A | 11/2011 |
| JP | 5668913 B2 | 2/2015 |

OTHER PUBLICATIONS

Li et al., Li—O2 Cell with LiI(3-hydroxypropionitrile)2 as a Redox Mediator: Insight into the Working Mechanism of I-during Charge in Anhydrous Systems, The Journal of Physical Chemistry Letters 8:4218-4225 (2017).

Liu et al., Cycling Li—O2 batteries via LiOH formation and decomposition, Science 350(6260):530-533 (2015).

Olsen et al., Dissolution of platinum in methoxy propionitrile containing LiI/I2, Solar Energy Materials & Solar Cells 63:267-273 (2000).

Sygkridou et al., Functional transparent quasi-solid state dye-sensitized solar cells made with different oligomer organic/inorganic hybrid electrolytes, Solar Energy Materials & Solar Cells 159:600-607 (2017).

Zhao et al., High-performance rechargeable lithium-iodine batteries using triiodideliodide redox couples in an aqueous cathode, Nature Communications pp. 1-7 (4:1896; DOI: 10.1038/ncomms2907; www.nature.com/naturecommunications) (2013).

Zhao et al., A 3.5 V Lithium-Iodine Hybrid Redox Battery with Vertically Aligned Carbon Nanotube Current Collector, Nano Letters 14:1085-1092 (2014).

Zhu et al., Proton enhanced dynamic battery chemistry for aprotic lithium-oxygen batteries, Nature Communications pp. 1-8 (8:14308; DOI: 10.1038/ncomms14308; www.nature.com/naturecommunications) (2017).

Byron et al., High-performance rechargeable lithium-iodine batteries using triiodide/iodide redox couples in an aqueous cathode, Nature Communications, pp. 1-7 (4:1896; DOI: 10.1038/ncomms2907; www.nature.com/naturecommunications) (2013).

Grey et al., Cycling Li—O2 batteries via LiOH formation and decomposition, Science 350(6260):530-533 (2015).

Wang et al., Proton enhanced dynamic battery chemistry for aprotic lithium-oxygen batteries, Nature Communications pp. 1-8 (8:14308; DOI: 10.1038/ncomms14308; www.nature.com/naturecommunications) (2017).

Li et al., Li—O2 Cell with LiI(3-hydroxypropionitrile)2 as a Redox Mediator: Insight into the Working Mechanism of I-during Charge in Anhydrous Systems, The Journal of Physical Chemistry Letters 8:4218-4225 (2017).

Zhao et al., High-performance rechargeable lithium-iodine batteries using triiodide/iodide redox couples in an aqueous cathode, Nature Communications pp. 1-7 (4:1896; DOI: 10.1038/ncomms2907; www.nature.com/naturecommunications) (2013).

Perathoner and Centi, Advanced Nanocarbon Materials for Future Energy Applications, Emerging Materials for Energy Conversions and Storage, Chapter 9, pp. 305-329, Elsevier, Inc., 2018.

* cited by examiner

RECHARGEABLE METAL HALIDE BATTERY

BACKGROUND

Rechargeable batteries are used as a power source in a wide range of applications. For example, rechargeable batteries are often used in industrial devices, medical devices, electronic devices, electric vehicles, and grid energy storage systems, among others. Battery technology is continually being developed to enable higher energy density and greater efficiency, thereby permitting use of batteries as power sources for additional applications.

The need for high specific capacities and specific energies has led to the study of various metal-element batteries. Cathode materials, such as lithium nickel manganese cobalt oxide (NMC), lithium nickel cobalt aluminum oxide (NCA), lithium cobalt oxide (LCO), lithium iron phosphate (LFP), or the like have relatively low energy densities and may be expensive. Because of these qualities of some cathode materials, gases such as sulfur, oxygen, air, and others have been investigated for use as active cathode materials.

Batteries made with lithium-oxygen, lithium-air, and lithium with other gas mixtures containing oxygen have been attractive due to the low atomic number, low density, and high reducing capability of elemental lithium. Moreover, a lithium-oxygen battery could potentially have a theoretical specific energy three to five times greater than conventional lithium ion batteries.

SUMMARY

Some batteries including sulfur, oxygen, air, or other gases as the active cathode material have low cyclability, low power density, or both. For example, such batteries may be relatively unstable and/or undergo parasitic reactions which may result in electrochemically irreversible carbonate byproducts that reduce the cyclability and/or power density of the battery, e.g., due to electrolyte decomposition or carbon surface oxidation.

Herein is described a battery with an electrolyte including an oxidizing gas, a metal halide, and a solvent including a nitrile compound. In some embodiments, the battery of the present disclosure has one or more of a relatively fast charging rate, high energy efficiency, high power density, and good cyclability. Additionally, in some embodiments, the electrolyte described herein may be more cost effective than some other electrolytes. In one aspect, the present disclosure is directed to a battery including an anode; an electrolyte including an oxidizing gas; a metal halide that functions as an active cathode material; and a solvent including a nitrile compound, wherein the oxidizing gas and the metal halide are dissolved in the solvent, and wherein the electrolyte is in contact with the anode; and a current collector contacting the cathode material.

In another aspect, the present disclosure is directed to a battery including: (a) an anode that: (i) takes up metal ions from a liquid electrolyte during charging, and (ii) releases the ions to the liquid electrolyte during discharging, the liquid electrolyte including: (i) a solvent containing at least one nitrile group, and (ii) an oxidizing gas dissolved in the solvent, and (iii) a metal halide dissolved in the solvent, wherein the metal halide functions as a cathode for the battery; (b) a solid electrolyte interphase (SEI) layer contacting the anode, the SEI layer including an oxide of the metal; and (c) a current collector including an electrically conductive porous material, wherein the current collector contacts the cathode.

In yet another aspect, the present disclosure is directed to a method of forming a battery, including: dissolving a metal halide in a solvent including a nitrile to form a solution; soaking a separator with the solution; stacking an anode, the separator soaked with the solution, and a current collector, wherein the stacking includes placing the separator between the anode and the current collector; and introducing an oxidizing gas to the stacked anode, separator, and current collector to form the battery, wherein the battery includes: an anode, an electrolyte including: an oxidizing gas; a metal halide that functions as an active cathode material; and a solvent including a nitrile compound; and a current collector contacting the cathode material.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

Like symbols in the figures indicate like elements.

DETAILED DESCRIPTION

Figure 1:
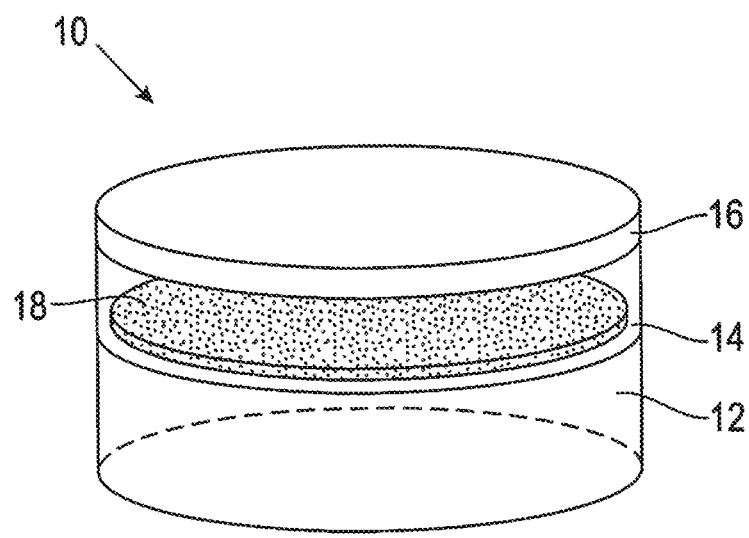
FIG. 1 is a conceptual diagram illustrating an example battery including an anode, an electrolyte, a current collector, and a separator.

FIG. 1 is a conceptual diagram illustrating an example battery 10 including an anode 12, an electrolyte 14, a current collector 16, and a separator 18. Battery 10 operates via reduction-oxidation (redox) reactions. For example, battery 10 utilizes different oxidation states and redox reactions of one or more components or elements to charge and discharge battery 10.

Anode 12 may be any metal anode. As examples, which are not intended to be limiting, suitable anodes 12 include lithium, magnesium, or sodium. In some examples, anode 12 consists essentially of elemental lithium, magnesium, or sodium, or lithium, or magnesium, or sodium alloyed with one or more additional elements. The anode 12 may take up metal ions from electrolyte 14 during charging, and release the metal ions to electrolyte 14 during discharging. For example, anode 12 may be an intercalation host material capable of taking up metal ions. In some examples, a solid electrolyte interphase (SEI) layer may be in contact with anode 12. For example, the SEI layer may include an oxide of a metal from electrolyte 14.

The electrolyte 14 includes a solvent including a nitrile compound, a metal halide, and an oxidizing gas.

The nitrile compound has the chemical formula of N≡C—R or N≡C—R—C≡N, where R is an organic functional group. Examples of organic functional groups for the nitrile compound include ethers, alkyls ethers, thioethers, alkyl thioethers, and the like. In some examples, which are not intended to be limiting, the nitrile is chosen from valeronitrile, nonanenitrile, hexanenitrile, acetonitrile, propionitrile, glutaronitrile, methoxyacetonitrile (MAN), methoxybenzonitrile, methoxypropionitrile (e.g., 3-methoxypropionitrile (MPN)), methylglutaronitrile, butoxypropionitrile, butoxybenzonitrile, and mixtures and combinations thereof. In some examples, the nitrile compound in the electrolyte 14 may improve electrochemical performance (e.g., reversibility, rechargeability, and/or cyclability), produce fewer irreversible carbonate byproducts, or improve power density.

In some examples, the electrolyte 14 may include one or more additional solvents. In some embodiments, the one or more additional solvents may be chosen from non-aqueous, organic solvents such as an ether, a glyme, a carbonate, a nitrile, an amide, an amine, an organosulfur solvent, an organophosphorus solvent, an organosilicon solvent, a fluorinated solvent, adiponitrile (ADN), propylene carbonate (PC), dimethoxyethane (DME), and mixtures and combinations thereof. In some examples, electrolyte 14 includes equal parts of the solvent including the nitrile and the one or more additional solvents. In some examples, the one or more additional solvents in the electrolyte 14 may further improve the electrochemical performance of battery 10, such as, for example, improved rechargeability, cyclability, or the like.

Electrolyte 14 includes an oxidizing gas. In some examples, electrolyte 14 may be in the presence of an oxidizing gas, and the phrase "includes an oxidizing gas" is intended to include such a configuration. In some examples, the oxidizing gas may be dissolved in the solvent including the nitrile compound of electrolyte 14. In some examples, which are not intended to be limiting, the oxidizing gas includes at least one of oxygen, air, nitric oxide, or nitrogen dioxide. The oxidizing gas helps induce the redox reactions of battery 10 as described above, and helps achieve highly reversible redox reactions, which may contribute to enhanced electrochemical performance of battery 10. The oxidizing gas may help induce such redox reactions, but is not consumed or evolved during use of battery 10 (e.g., the oxidizing gas does not participate in the redox reactions of battery 10). In some examples, an electrolyte including a metal halide and a solvent including a nitrile, but not including an oxidizing gas, may exhibit little or no rechargeability.

Electrolyte 14 also includes a metal halide (e.g., MX, where M is a metal element and X is a halogen element). In some examples, the metal halide includes an electrolyte salt that dissociates into a respective halide ion and a respective metal ion. For example, the metal halide may dissolve in the solvent including a nitrile compound, and dissociate into the respective metal and halide ions. In some examples, the halide ion may include an ion of at least one of I, Br, Cl, or F (e.g., X may be I, Br, Cl, or F), and the metal ion may include an ion of at least one of Li, Mg, or Na (e.g., M may be Li, Mg, or Na). In other examples, the metal halide may include elements other than I, Br, Cl, F, Li, Mg, and/or Na. The metal halide may provide electrolyte 14 with ionic conductivity.

Additionally, or alternatively, the metal halide of electrolyte 14 may function as an active cathode material. For example, the metal halide may receive, store, and release the metal ions during charging and discharging of battery 10. In this way, battery 10 may not include a dedicated cathode material. Instead, battery 10 may include the active cathode material of the metal halide of electrolyte 14 and a current collector 16. In turn, battery 10 may be cheaper to make, more lightweight, have a higher power density, or combinations thereof. In some cases, the high power density of the electrolyte including the metal halide that functions as an active cathode material may enable battery 10 to be charged significantly faster than some other batteries that do not include the electrolyte described herein. In some examples, an electrolyte including a solvent including a nitrile compound and an oxidizing gas, but not including a metal halide, may have reduced electrochemical performance (e.g., reversibility, rechargeability, and/or cyclability), produce irreversible carbonate byproducts, have reduced power density, or combinations thereof in comparison to electrolyte 14.

The current collector 16 may include a material of suitable electrical conductivity that collects electrons generated by a redox reaction during discharge of battery 10 and provides a conductive path to an external electrical circuit to which battery 10 is connected. Similarly, during recharge of battery 10, current collector 16 provides an electrical pathway between an external voltage source and electrolyte 14 to supply voltage for another redox reaction to charge battery 10. In some examples, current collector 16 may include electrically conductive powders such as metal and/or carbon powders, woven or non-woven metal fibers, metal foam, woven or non-woven carbon fibers, or the like. Additionally, or alternatively, currently collector 16 may include stainless-steel mesh, aluminum (Al) mesh, nickel (Ni) foam, and/or carbon paper. For example, in one embodiment, the current collector 16 may include a stainless-steel mesh with carbon nanoparticles deposited thereon. As yet another example, current collector may be a porous material that is electrically conductive.

In other examples, battery 10 may include a dedicated cathode material in addition to the metal halide functioning as the active cathode material and current collector 16. For example, battery 10 may include a cathode that provides a conductive path to an external electrical circuit to which battery 10 is connected. In some cases, battery 10 may include a cathode that may be used in a Li-ion battery. For example, the cathode may include at least one of lithium cobalt oxide (LCO, e.g., $LiCoO_2$), nickel cobalt aluminum (NCA, e.g., $LiNi_xCo_yAl_zO_2$, $LiNi_{0.8}Co_{0.15}Al_{0.05}O_2$), lithium ion manganese oxide (LMO, e.g., $LiMn_2O_4$), lithium nickel manganese cobalt oxide (NMC, e.g., $LiNiMnCoO_2$), nickel cobalt manganese (NCM, e.g., $LiNi_xCo_yMn_zO_2$, $LiNi_{0.33}Co_{0.33}Mn_{0.33}O_2$) or lithium iron phosphate (LFP, e.g., $LiFePO_4$). In other examples, battery 10 may include a different or an additional cathode material.

In some examples, battery 10 includes a separator 18. Separator 18 may force electrons through an external electrical circuit to which battery 10 is connected such that the electrons do not travel through battery 10 (e.g., through electrolyte 14 of battery 10), while still enabling the metal ions to flow through battery 10 during charge and discharge. In some examples, separator 18 may be soaked with electrolyte 14, within electrolyte 14, surrounded by electrolyte 14, or the like. Separator 18 may include a non-conductive material to prevent movement of electrons through battery 10 such that the electrons move through the external circuit instead. For example, separator 18 may include glass, non-woven fibers, polymer films, rubber, or the like. In other examples, battery 10 may not include separator 18.

In some examples, battery 10 has a closed or substantially closed volume. For example, anode 12, electrolyte 14, current collector 16, and separator 18 may be within a closed or substantially closed cell or other enclosure. In this way, the oxidizing gas of electrolyte 14 may remain within battery 10 such that battery 10 functions with a relatively fast charging rate, high energy efficiency, high power density, high reversibility, high cyclability, or combinations thereof, as described herein.

Battery 10 may be capable of undergoing many charging and discharging cycles (e.g., exhibits good rechargeability), even at relatively high charging densities. In some examples, battery 10 is capable of completing at least 100 cycles of charging and discharging at a current density of greater than or equal to about 1 $mA/cm^2$, about 5 $mA/cm^2$, about 10 $mA/cm^2$, or about 20 $mA/cm^2$. As one example, battery 10 may be capable of completing at least 1000 cycles of charging and discharging at a current density of greater than or equal to about 1 $mA/cm^2$, about 5 $mA/cm^2$, about 10 $mA/cm^2$, or about 20 $mA/cm^2$.

Additionally, or alternatively, battery 10 may exhibit a relatively high energy efficiency. For example, battery 10 may exhibit an energy efficiency of greater than or equal to 90% at a current density of greater than or equal to about 1 $mA/cm^2$, about 5 $mA/cm^2$, about 10 $mA/cm^2$, or about 20 $mA/cm^2$. In some examples, battery 10 may exhibit an energy efficiency of greater than or equal to 99% at a current density of greater than or equal to about 1 mA/cm$^2$, about 5 mA/cm$^2$, about 10 mA/cm$^2$, or about 20 mA/cm$^2$.

Figure 2:
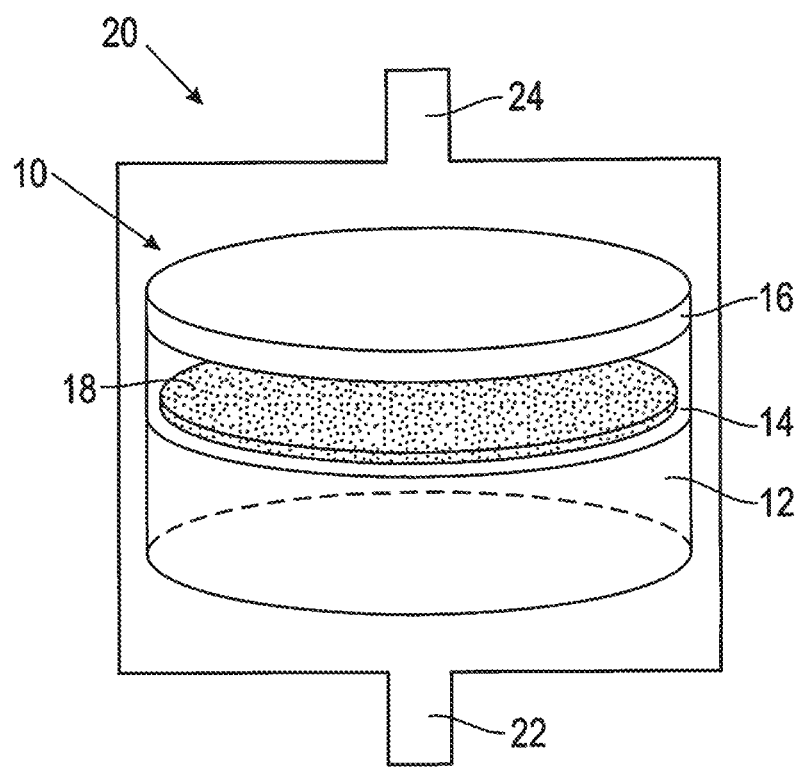
FIG. 2 is a conceptual diagram illustrating the example battery of FIG. 1 within an enclosed cell.

FIG. 2 is a conceptual diagram illustrating the example battery 10 of FIG. 1 within an enclosed cell system 20. Enclosed cell system 20 may include a cell that houses battery 10 during operation of battery 10, a cell used to fabricate battery 10, or both. For example, enclosed cell system 20 may include a cell available from Swagelok of Solon, Ohio, under the trade designation SWAGELOK, and may be used to fabricate battery 10. In some examples, enclosed cell system 20 may include an inlet tube 22 and/or an outlet tube 24. Inlet tube 22 and outlet tube 24 may be used to introduce and remove air or other gases, such as the oxidizing gas of electrolyte 14, into and out of the enclosed cell.

Figure 3:
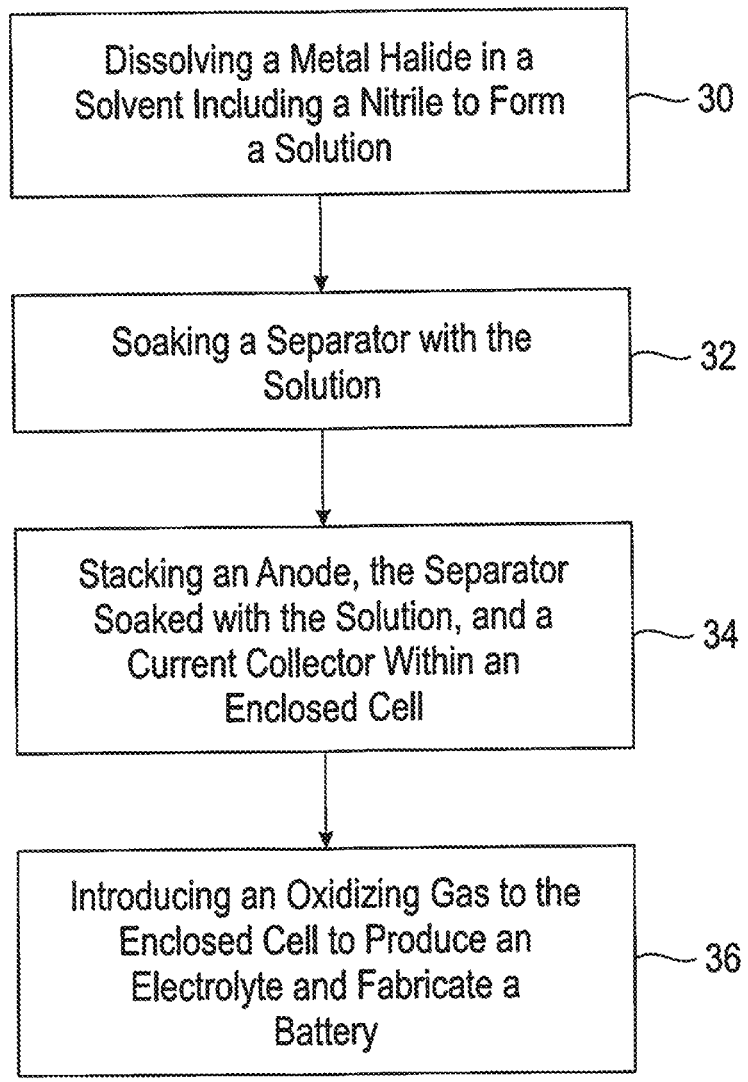
FIG. 3 is a flow diagram illustrating an example technique for fabricating a battery.
Figure 4A:
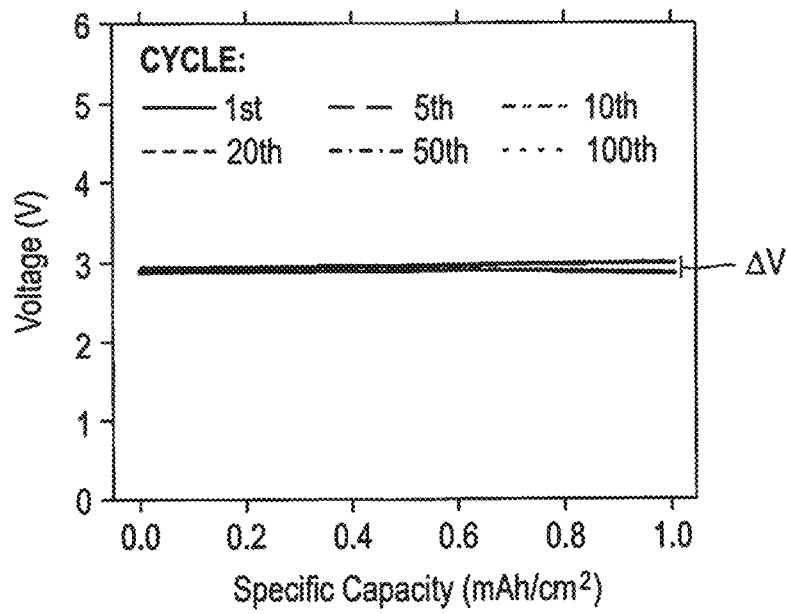
FIGS. 4A-4D are graphs illustrating galavanostatic cycling behavior of a battery cell with an electrolyte including LiI as the metal halide, 3-methoxypropionitrile (MPN) as the solvent including a nitrile, and oxygen as the oxidizing gas at current densities of 1 mA/cm$^2$, 2 mA/cm$^2$, and 5 mA/cm$^2$ with a limited capacity of 1 mAh/cm$^2$, and 2 mA/cm$^2$ with a limited capacity of 2 mAh/cm$^2$, respectively.
Figure 4B:
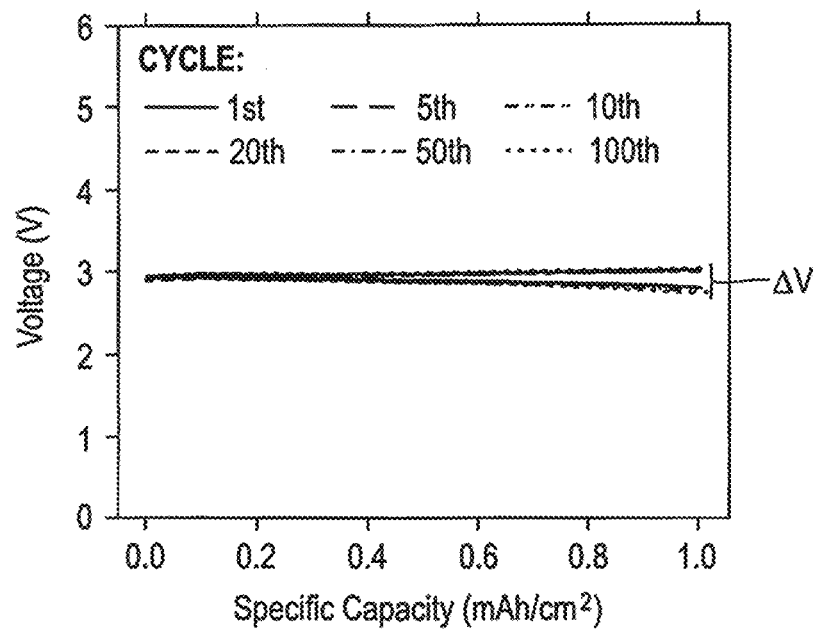
Figure 4C:
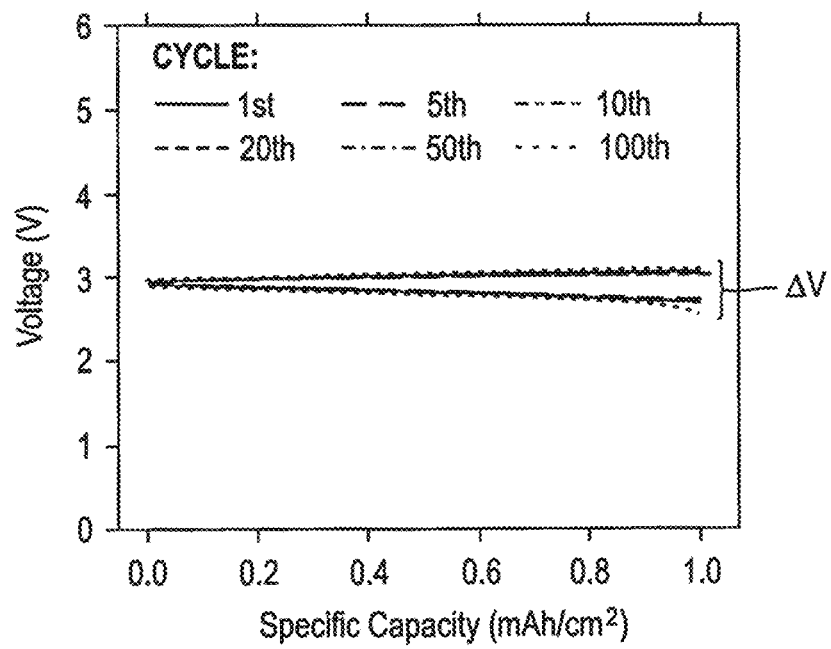
Figure 4D:
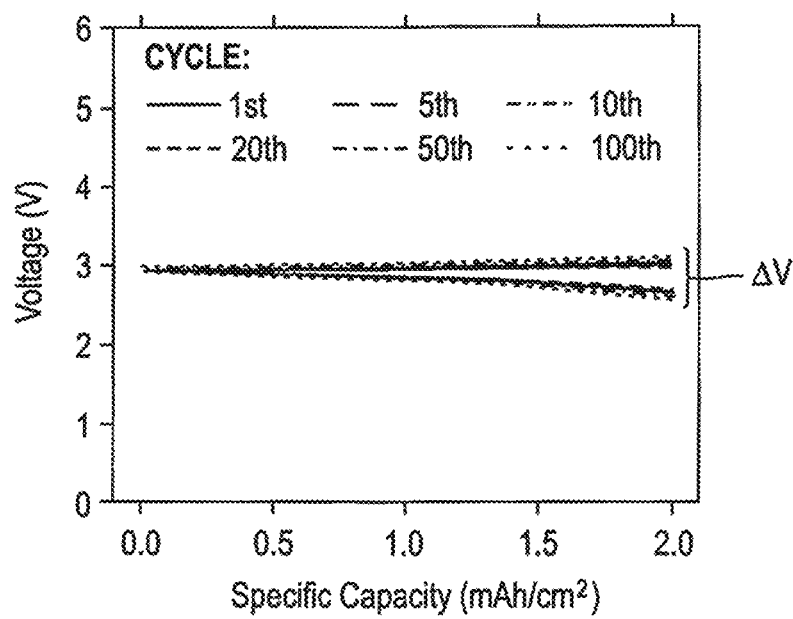

FIG. 3 is a flow diagram illustrating an example technique for fabricating battery 10 of FIG. 1. The technique of FIG. 3 will be described with respect to enclosed cell system 20 of FIG. 2. In other examples, however, the technique of FIG. 3 may be used with a system other than enclosed cell system 20 of FIG. 2. Moreover, although the technique of FIG. 3 is described with respect to an enclosed cell system, in some examples, FIG. 3 may be used with a cell that is not fully enclosed (e.g., at least partially opened).

The technique of FIG. 3 includes dissolving a metal halide in a solvent including a nitrile compound to form a solution (30). To dissolve the metal halide in the solvent including the nitrile compound, the metal halide may be added to the solvent including the nitrile compound and lightly stirred, such as lightly stirred overnight. In some examples, the solution of the metal halide dissolved in the solvent including the nitrile compound may have a concentration of between about 0.1 M and about 20 M, about 0.5 M and about 10 M, or about 1 M and about 5 M.

In some examples, the metal halide may be dried prior to being dissolved in the solvent including the nitrile. For example, the metal halide may be dried on a hotplate in an argon filled glovebox at about 120° C. for greater than 12 hours. In other examples, the metal halide may be dried at a different temperature or for a different amount of time. In some examples, the temperature and/or time may be chosen based on the metal halide to be used in electrolyte 14.

Additionally, or alternatively to drying the metal halide, in some examples, the solvent including the nitrile compound may also be dried prior to dissolving the metal halide in the solvent including the nitrile compound. For example, the solvent including the nitrile compound may be stored overnight with a molecular sieve. In other examples, the solvent including the nitrile compound may be dried in a different manner or for a different period of time.

The technique of FIG. 3 further includes soaking separator 18 with the solution (32). Soaking separator 18 with the solution may include dipping separator 18 into the solution, applying the solution to separator 18, or any other method of soaking separator 18 with the solution. In some examples, soaking separator 18 with the solution may include soaking separator 18 with the solution in a range of about 1 µL/cm$^2$ to about 500 µL/cm$^2$, about 10 µL/cm$^2$ to about 250 µL/cm$^2$, or about 50 µL/cm$^2$ to about 100 µL/cm$^2$.

The technique of FIG. 3 additionally includes stacking anode 12, separator 18 soaked with the solution, and current collector 16 within enclosed cell system 20 (34), e.g., as shown in FIG. 2. In some examples, the stacking may include placing separator 18 between anode 12 and current collector 16. In some examples, one or more of anode 12, separator 18 soaked with the solution, or current collector 16 may be stacked prior to soaking separator 18 with the solution. For example, separator 18 may be stacked on anode 12 and then soaked with the solution. In some cases, enclosed cell system 20 may be at least partially open during the stacking, and after anode 12, separator 18 soaked with the solution, and current collector 16 have been stacked, enclosed cell system 20 may be closed or substantially closed to form a closed or substantially closed volume around anode 12, separator 18 soaked with the solution, and current collector 16.

In other examples, battery 10 may not include separator 18. In such examples, electrolyte 14 may be introduced to battery 10 in a different manner. For example, battery 10 may include electrolyte 14 between anode 12 and current collector 16 without separator 18. Electrolyte 14 may be introduced into battery 10 in any applicable manner such that electrolyte 14 can function as described herein. In this way, the technique of FIG. 3 may include stacking anode 12 and current collector 16 within enclosed cell system 20.

The technique of FIG. 3 also includes introducing an oxidizing gas to enclosed cell system 20 to produce electrolyte 14 and fabricate battery 10 (36). In some examples, introducing the oxidizing gas to enclosed cell system 20 to produce electrolyte 14 and fabricate battery 10 includes introducing the oxidizing gas to the enclosed cell 20 via inlet tube 24. In some examples, enclosed cell system 20 may include or be in the presence of an inert gas, such as argon, prior to introducing the oxidizing gas to enclosed cell system 20. In some such examples, introduction of the oxidizing gas may purge and completely replace the inert gas within enclosed cell system 20 with the oxidizing gas. For example, the oxidizing gas may be introduced to the enclosed cell 20 via inlet tube 24, and the inert gas may be purged through outlet tube 26. In some examples, the concentration of the oxidizing gas in enclosed cell system 20 may be between about 5 weight (wt.) % and about 100 wt. %, about 50 wt. % and about 100 wt. %, or about 80 wt. % and about 100 wt. % of the total amount of gases within enclosed cell system 20, such as of the total amount of the oxidizing gas and the inert gas within enclosed cell system 20.

The present disclosure will now be described with respect to the following non-limiting examples.

EXAMPLES

Example 1: Battery Fabrication

LiI was chosen as the metal halide for the electrolyte. The LiI was placed in a first vial and dried on a hot plate inside an argon filled glovebox (<0.1 ppm H$_2$O, O$_2$) at 120° C. for over about 12 hours. The solvent including the nitrile compound was stored in a second vial with about 20 mg of molecular sieve (about 3 Å in pore diameter) overnight to dry the solvent. The dried LiI was added to the second vial containing the solvent including the nitrile compound to form a solution with a concentration of about 1 M. The LiI was dissolved in the solvent including the nitrile compound, and the solution was lightly stirred overnight. A glass fiber separator was soaked with solution on top of a lithium metal foil anode. The glass fiber separator was about 12 mm in diameter, and the lithium metal foil anode was about 11 mm in diameter and about 0.15 mm thick. Carbon nanoparticles were used as a current collector material, and were deposited on a stainless-steel round mesh having a diameter of about 11 mm. The battery cell assembly was done in the argon filled glovebox. The lithium metal foil anode, solution soaked glass fiber separator, and carbon-deposited current collector mesh were placed in that order within a Swagelok® type cell equipped with both an inlet tube and an outlet tube for oxygen flow. An oxidizing gas of oxygen was then introduced to the Swagelok® type cell using the inlet tube, which purged and completely replaced the argon gas inside of the Swagelok® type cell.

Example 2: Battery with MPN+LiI+Oxygen Electrolyte

A battery with an electrolyte including LiI as the metal halide, 3-methoxypropionitrile (MPN) as the solvent including a nitrile compound, and oxygen as the oxidizing gas was fabricated as described in Example 1.

FIGS. 4A-4D are graphs illustrating galavanostatic cycling behavior of the battery with an electrolyte including LiI as the metal halide, MPN as the solvent including the nitrile compound, and oxygen as the oxidizing gas at current densities of 1 mA/cm$^2$, 2 mA/cm$^2$, 5 mA/cm$^2$ with a limited capacity of 1 mAh/cm$^2$ (FIGS. 4A-4C), and 2 mA/cm$^2$ with a limited capacity of 2 mAh/cm$^2$ (FIG. 4D), respectively. As seen in FIGS. 4A-4D, there is a relatively narrow voltage gap ($\Delta V$) between charge and discharge cycles for the battery. In some examples, a narrow voltage gap ($\Delta V$) may indicate high energy efficiency of the battery. The battery also exhibits a high degree of electrochemical reversibility, as seen by the charge and discharge voltages remaining relatively constant over more than 100 cycles at a high current density (e.g., greater than about 1 mAh/cm$^2$).

Figure 5:
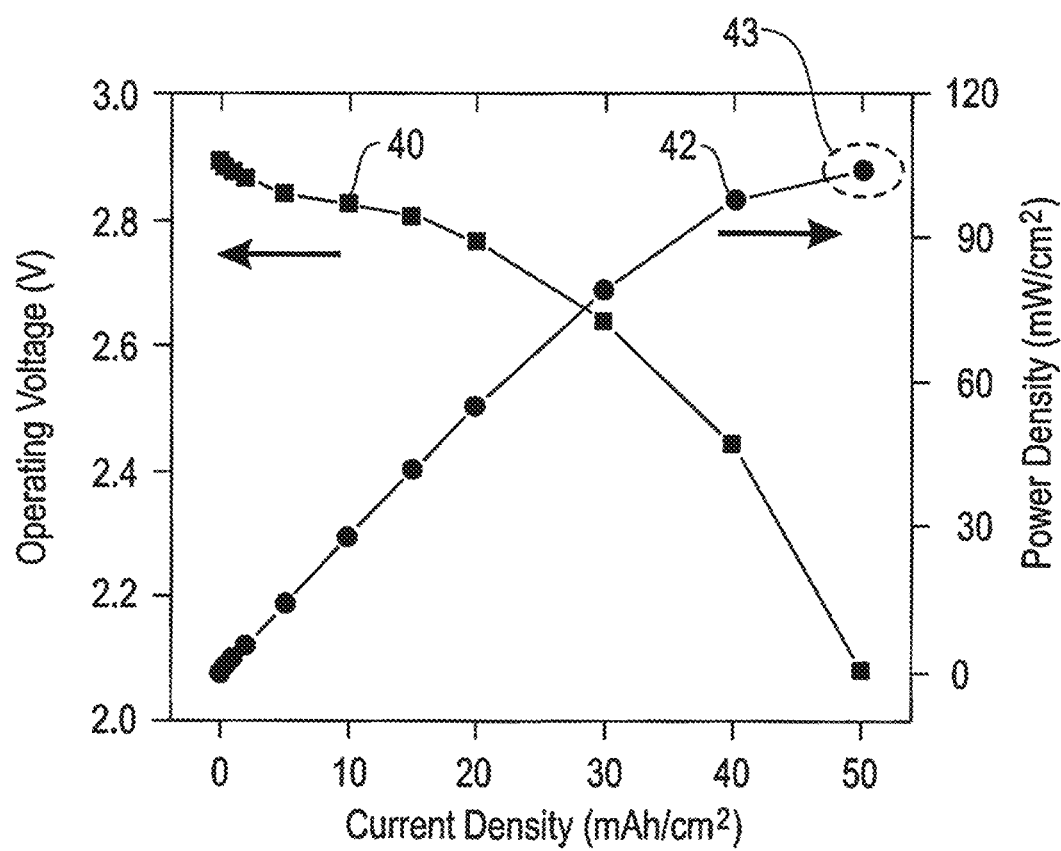
FIG. 5 is a graph illustrating operating discharge voltages at a capacity of 0.5 mAh/cm$^2$ and areal power densities versus applied current density for the battery cell with an electrolyte including LiI as the metal halide, MPN as the solvent including a nitrile, and oxygen as the oxidizing gas.

FIG. 5 is a graph illustrating operating discharge voltages (40) at a capacity of 0.5 mAh/cm$^2$ and areal power densities (42) versus applied current density for the battery with an electrolyte including LiI as the metal halide, MPN as the solvent including the nitrile compound, and oxygen as the oxidizing gas. Each areal power density (42) was determined using the corresponding operating discharge voltage (40) and applied current density. The battery performed up to an areal power density (42) of about 100 mW/cm$^2$ (43), which in some cases, is significantly higher than other rechargeable batteries.

Figure 6:
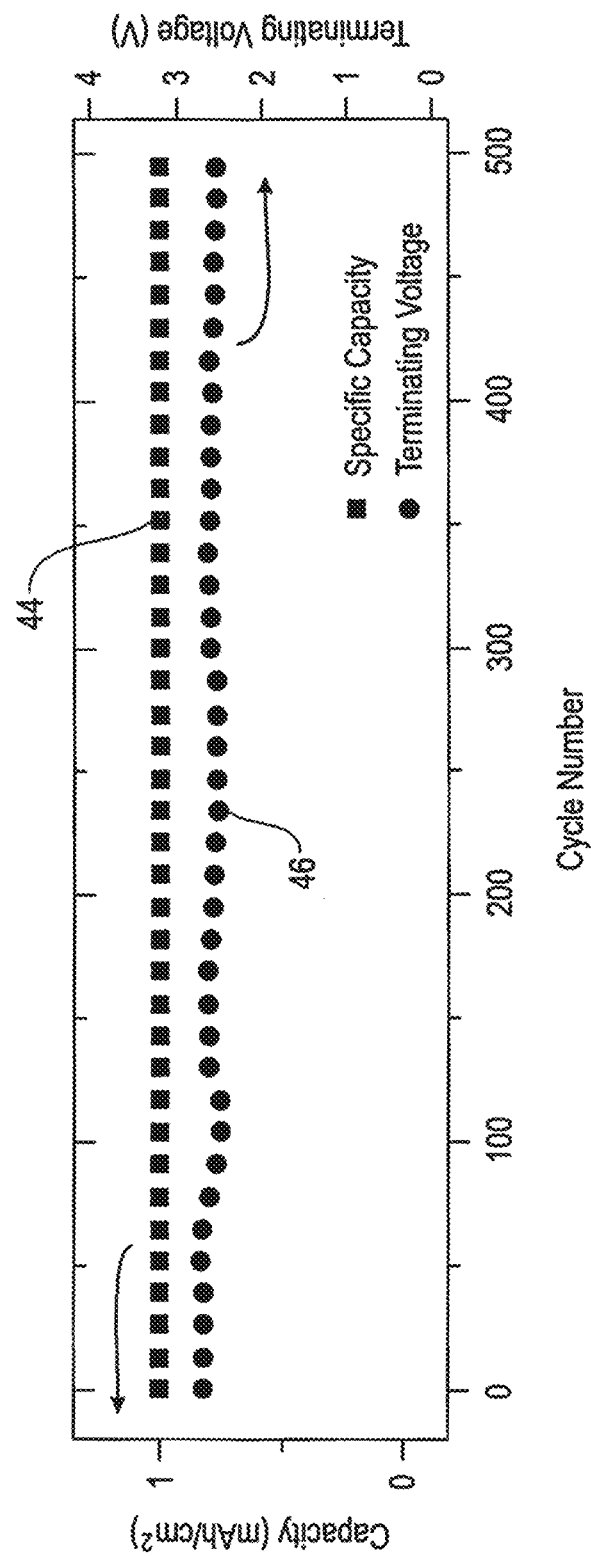
FIG. 6 is a graph illustrating specific capacity of the battery cell with an electrolyte including LiI as the metal halide, MPN as the solvent including a nitrile, and oxygen as the oxidizing gas with a limited capacity of 1 mAh/cm$^2$ at a current density of 5 mA/cm$^2$ and terminating voltage at a capacity of 1 mAh/cm$^2$.

FIG. 6 is a graph illustrating specific capacity (44) of the battery with an electrolyte including LiI as the metal halide, MPN as the solvent including the nitrile compound, and oxygen as the oxidizing gas with a limited capacity of 1 mAh/cm$^2$ at a current density of 5 mA/cm$^2$, and terminating voltage (46) at a capacity of 1 mAh/cm$^2$. The battery was able to undergo 500 cycles at a current density of about 5 mA/cm$^2$, losing only about 7% of the terminating voltage (46) from the initial terminating voltage, and without losing any capacity from the limited capacity of about 1 mAh/cm$^2$. As seen in FIG. 6, the relatively flat profiles of the specific capacity (44) and the terminating voltage (46) over 500 cycles may also indicate that there was relatively little or even no dendrite formation within the battery. For example, dendrite formation may have led to a reduced specific capacity (44) of the battery, which is not seen in FIG. 6, even after 500 cycles. Without being bound by theory, being able to apply a high current density in metal based batteries may indicate an ability to form small and dense nuclei that are also uniform in size, which may result in powerful and natural suppression of dendrite growth.

Figure 7:
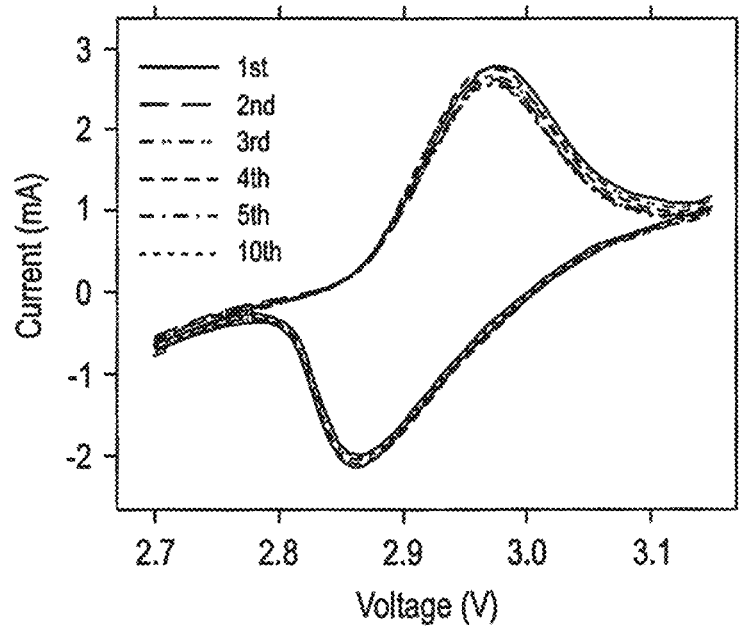
FIG. 7 is a graph illustrating cyclic voltammetry (CV) data of the battery cell with an electrolyte including LiI as the metal halide, MPN as the solvent including a nitrile, and oxygen as the oxidizing gas at a scan rate of 0.05 mV/s.

FIG. 7 is a graph illustrating cyclic voltammetry (CV) data of the battery with an electrolyte including LiI as the metal halide, MPN as the solvent including the nitrile compound, and oxygen as the oxidizing gas at a scan rate of 0.05 mV/s. As seen in FIG. 7, the CV cycles of the battery remain relatively constant over 10 cycles, which indicate that the battery is highly rechargeable.

Figure 8:
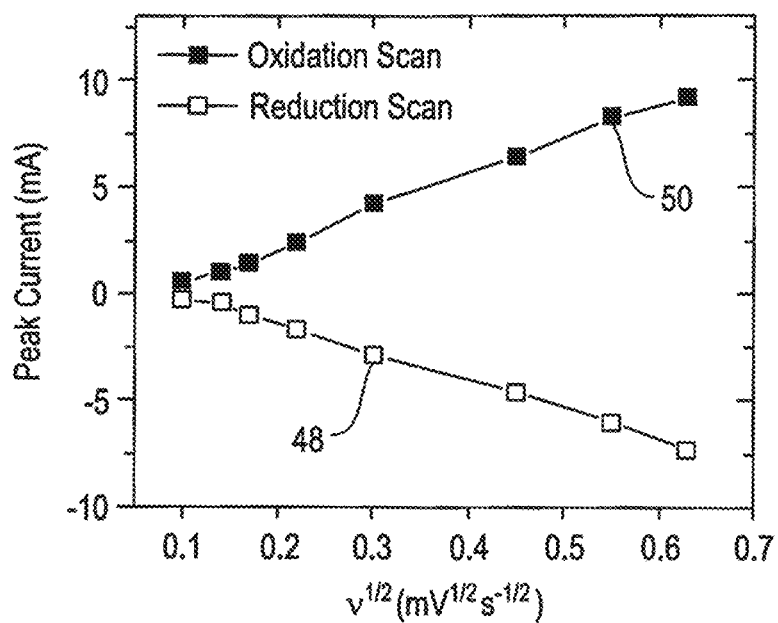
FIG. 8 is a graph illustrating peak currents of the battery with an electrolyte including LiI as the metal halide, MPN as the solvent including a nitrile, and oxygen as the oxidizing gas at various scan rates (v).

FIG. 8 is a graph illustrating peak currents of the battery with an electrolyte including LiI as the metal halide, MPN as the solvent including the nitrile compound, and oxygen as the oxidizing gas at various scan rates (v). FIG. 8 shows the peak currents for both reduction (48) and oxidation (50) of the battery versus the square root of the scan rate ($v^{1/2}$). Similar to FIG. 7, FIG. 8 indicates that the battery is highly rechargeable. For example, the peak currents increase or decrease at about the same rate for both the oxidation scan (50) and reduction scan (48), respectively, as the square root of the scan rate increases. The linearization of the oxidation scan (50) and the reduction scan (48) as seen in FIG. 8 also indicates that the redox reaction of the battery is diffusion limited with respect to moving entities in the electrolyte. In turn, this may indicate that the redox reactions occur very quickly, and that the redox reactions may require a negligible activation energy to initiate the reactions (e.g., when the moving entities encounter each other).

Figure 9A:
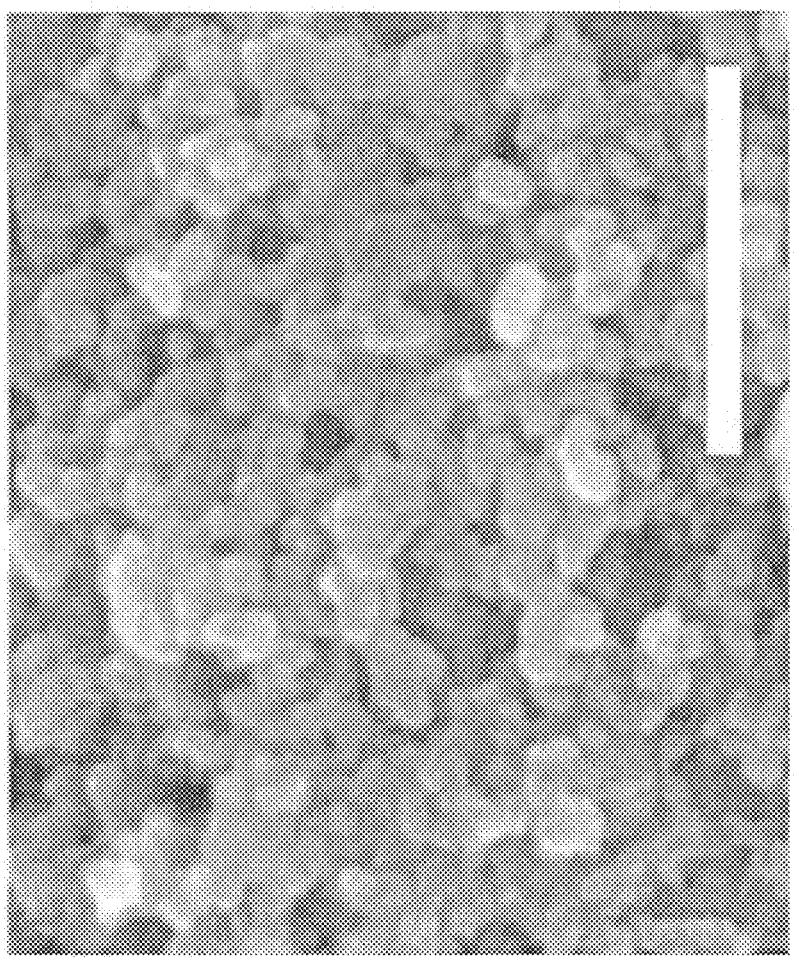
FIG. 9A is a scanning electron microscope (SEM) image of carbon additives on the current collector of the battery with an electrolyte including LiI as the metal halide, MPN as the solvent including a nitrile, and oxygen as the oxidizing gas in a discharged state.
Figure 9B:
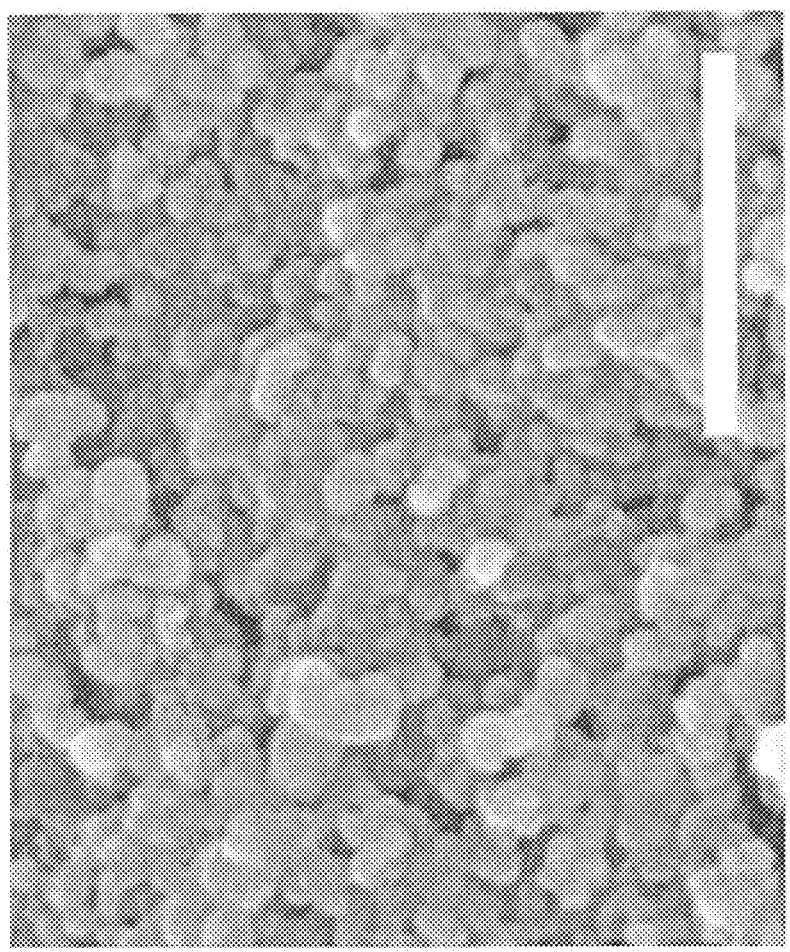
FIG. 9B is a SEM image of carbon additives on the current collector of the battery with an electrolyte including LiI as the metal halide, MPN as the solvent including a nitrile, and oxygen as the oxidizing gas in a charged state.

FIG. 9A is a scanning electron microscope (SEM) image of the carbon current collector (e.g., carbon nanoparticles on the stainless steel mesh) of the battery with an electrolyte including LiI as the metal halide, MPN as the solvent including the nitrile compound, and oxygen as the oxidizing gas in a discharged state. FIG. 9B is a SEM image of carbon additives on the current collector of the battery with an electrolyte including LiI as the metal halide, MPN as the solvent including the nitrile compound, and oxygen as the oxidizing gas in a charged state. Both FIG. 9A and FIG. 9B show the carbon current collector, without any significant changes in morphology of the carbon. As seen in FIGS. 9A and 9B, a discharge product does not block the pores of the current collector of the battery.

Figure 10:
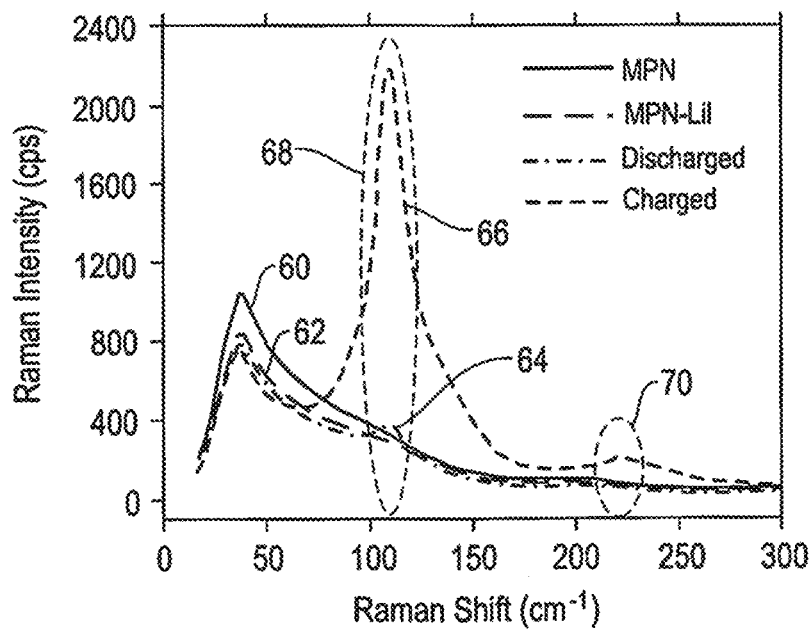
FIG. 10 is a graph illustrating a Raman spectrum of the glass fiber separator soaked with the solvent including the nitrile, the solution including the solvent including the nitrile and the dissolved metal halide, the solution including the solvent including the nitrile and the dissolved metal halide in a discharged state, and the solution including the solvent including the nitrile and the dissolved metal halide in a charged state.

FIG. 10 is a graph illustrating a Raman spectrum of the glass fiber separator soaked with the solvent including the nitrile compound (60), the solution including the solvent including the nitrile compound and the dissolved metal halide (62), the solution including the solvent including the nitrile compound and the dissolved metal halide in a discharged state (64), and the solution including the solvent including the nitrile compound and the dissolved metal halide in a charged state (66). FIG. 10 shows a significant increase in Raman intensity at a Raman shift of about 110 cm$^{-10}$ (68) after charging, indicating the presence of triiodide ($I_3^-$, charge product). In this way, FIG. 10 shows that the redox reaction of the battery described herein likely involves an iodide and triiodide system, e.g., reduction and oxidation of the halide of the metal halide.

Figure 11:
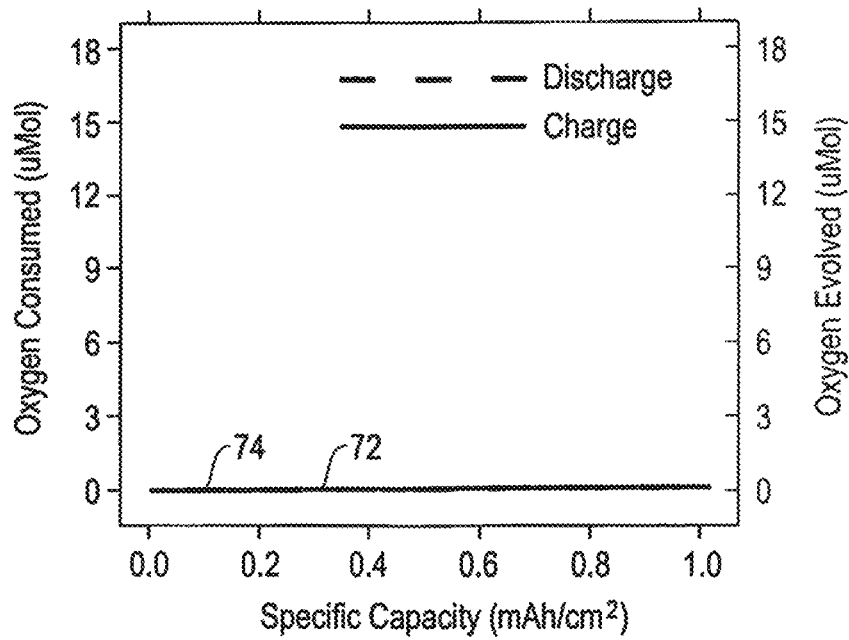
FIG. 11 is a graph illustrating an amount of oxygen consumed and an amount of oxygen evolved during cycling of the battery with an electrolyte including LiI as the metal halide, MPN as the solvent including a nitrile, and oxygen as the oxidizing gas.

FIG. 11 is a graph illustrating an amount of oxygen consumed (74) and an amount of oxygen evolved (72) during cycling of the battery with an electrolyte including LiI as the metal halide, MPN as the solvent including the nitrile compound, and oxygen as the oxidizing gas. As seen by the flat lines at 0 µMol for both the amount of oxygen consumed (74) and the amount of oxygen evolved (72) over a range of specific capacities, the battery does not consume or evolve oxygen during cycling.

Figure 12A:
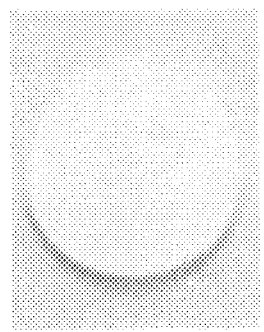
FIGS. 12A-12E are photographs illustrating the glass fiber separators at different states.
Figure 12B:
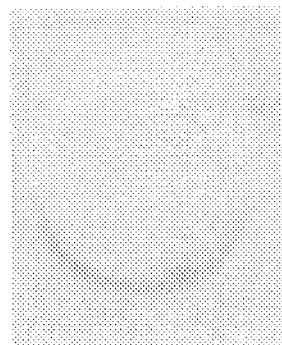
Figure 12C:
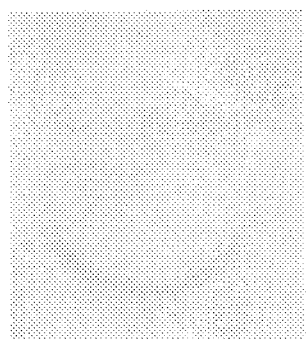
Figure 12D:
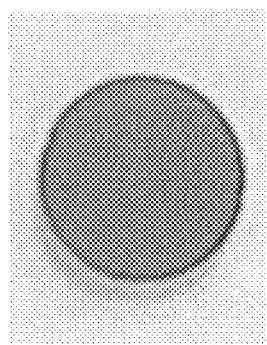
Figure 12E:
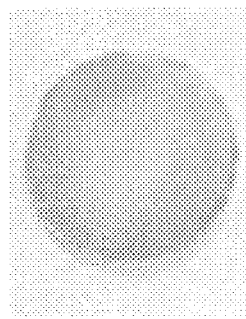

FIGS. 12A-12E are photographs illustrating the glass fiber separators at different states. FIG. 12A illustrates the glass fiber separator alone. FIG. 12B illustrates the glass fiber separator after being soaked with the solvent including the nitrile compound. FIG. 12C illustrates the glass fiber separator soaked with the solution including the solvent including the nitrile compound and the dissolved metal halide. FIG. 12D illustrates the glass fiber separator soaked with the solution including the solvent including the nitrile compound and the dissolved metal halide in a charged state. FIG. 12E illustrates the glass fiber separator soaked with the solution including the solvent including the nitrile compound and the dissolved metal halide in a discharged state. As seen in FIGS. 12D and 12E, the color of the solution of the battery becomes reddish brown during charging and turns yellow during discharging. This indicates the change in oxidation state of the iodide during charging and discharging. For example, FIG. 12D indicates the presence of triiodide produced during charging of the battery, and FIG. 12E indicates the loss of the triiodide during discharging of the battery.

Example 3: Battery with MAN+LiI+Oxygen Electrolyte

A battery with an electrolyte including LiI as the metal halide, methoxyacetonitrile (MAN) as the solvent including a nitrile compound, and oxygen as the oxidizing gas was fabricated as described in Example 1.

Figure 13:
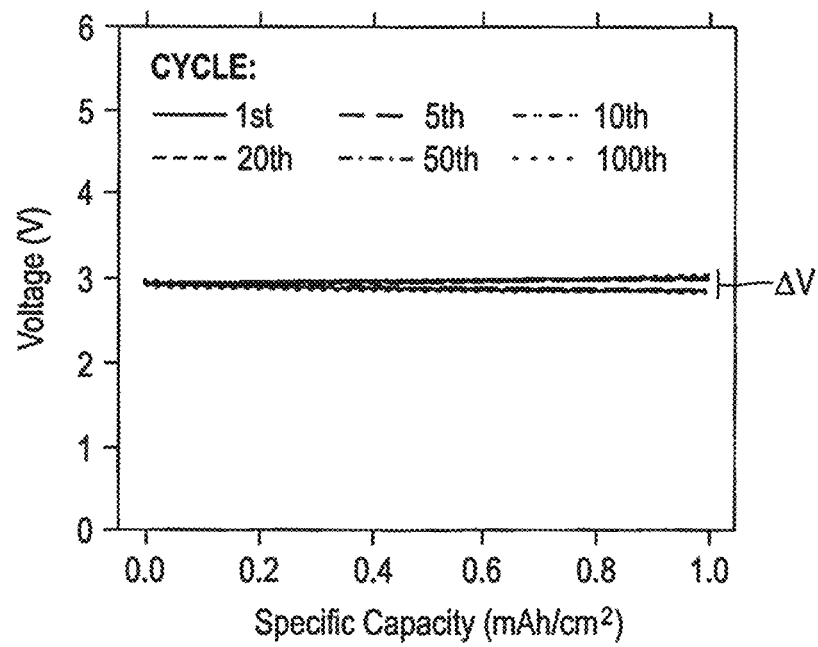
FIG. 13 is a graph illustrating galavanostatic cycling behavior of a battery cell with an electrolyte including LiI as the metal halide, methoxyacetonitrile (MAN) as the solvent including a nitrile, and oxygen as the oxidizing gas at a current density of 5 mA/cm$^2$.

FIG. 13 is a graph illustrating galavanostatic cycling behavior of a battery cell with an electrolyte including LiI as the metal halide, MAN as the solvent including the nitrile compound, and oxygen as the oxidizing gas at a current density of 5 mA/cm$^2$. The battery was tested with the limited capacity of 1 mAh/cm$^2$ at room temperature. The relatively narrow voltage gap ($\Delta$V) indicates high energy efficiency, even at a high current density of 5 mA/cm$^2$. FIG. 13 also indicates that the battery including an electrolyte with LiI as the metal halide, MAN as the solvent including the nitrile compound, and oxygen as the oxidizing gas is highly rechargeable.

Example 4: Battery with MPN-ADN+LiI+Oxygen Electrolyte

A battery with an electrolyte including LiI as the metal halide, a 1:1 ratio of MPN and adiponitrile (ADN) as the solvent including a nitrile compound, and oxygen as the oxidizing gas was fabricated as described in Example 1.

Figure 14:
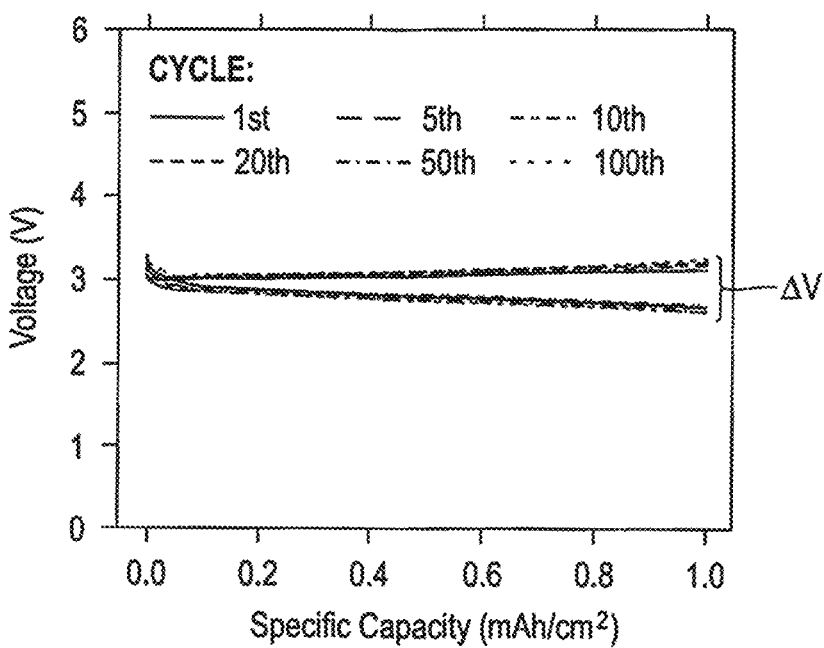
FIG. 14 is a graph illustrating galavanostatic cycling behavior of the battery including an electrolyte with LiI as the metal halide, a 1:1 ratio of MPN and adiponitrile (ADN) as the solvent including a nitrile, and oxygen as the oxidizing gas at a current density of about 15 mA/cm$^2$.

FIG. 14 is a graph illustrating galavanostatic cycling behavior of the battery including an electrolyte with LiI as the metal halide, a 1:1 ratio of MPN and ADN as the solvent including the nitrile compound, and oxygen as the oxidizing gas at a current density of about 15 mA/cm$^2$. The battery was tested with the limited capacity of 1 mAh/cm$^2$ at room temperature. The relatively narrow voltage gap ($\Delta$V) indicates a high energy efficiency, even at a very high current density of 15 mA/cm$^2$. FIG. 14 also indicates that the battery is highly rechargeable.

Example 5: Battery with MPN-PC+LiI+Oxygen Electrolyte

A battery with an electrolyte including LiI as the metal halide, a 1:1 ratio of MPN and propylene carbonate (PC) as the solvent including a nitrile compound, and oxygen as the oxidizing gas was fabricated as described in Example 1.

Figure 15:
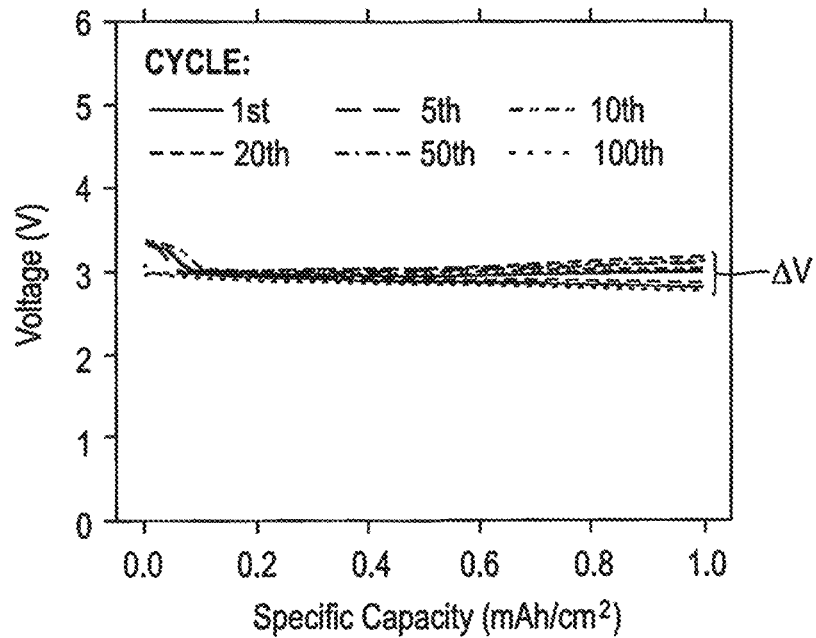
FIG. 15 is a graph illustrating galavanostatic cycling behavior of the battery including an electrolyte with LiI as the metal halide, a 1:1 ratio of MPN and propylene carbonate (PC) as the solvent including a nitrile, and oxygen as the oxidizing gas at a current density of about 5 mA/cm$^2$.

FIG. 15 is a graph illustrating galavanostatic cycling behavior of the battery including an electrolyte with LiI as the metal halide, a 1:1 ratio of MPN and PC as the solvent including the nitrile compound, and oxygen as the oxidizing gas at a current density of about 5 mA/cm$^2$. The battery was tested with a limited capacity of 1 mAh/cm$^2$ at room temperature. FIG. 15 shows that the electrochemical performance at the current density of 5 mA/cm$^2$ for the battery including an electrolyte with LiI as the metal halide, a 1:1 ratio of MPN and PC as the solvent including the nitrile compound, and oxygen as the oxidizing gas was comparable to the battery of Example 2. Because the electrochemical performance was similar to that of the battery of Example 2, this may indicate that a carbonate based electrolyte (e.g., the PC of the solvent including the nitrile compound) may not interfere with the redox reactions of the battery. For example, FIG. 15 may indicate that the presence of PC in the battery does not contribute to degradation of the battery.

Example 6: Battery with MPN-DME+LiI+Oxygen Electrolyte

A battery with an electrolyte including LiI as the metal halide, a 1:1 ratio of MPN and dimethoxyethane (DME) as the solvent including a nitrile compound, and oxygen as the oxidizing gas was fabricated as described in Example 1.

Figure 16:
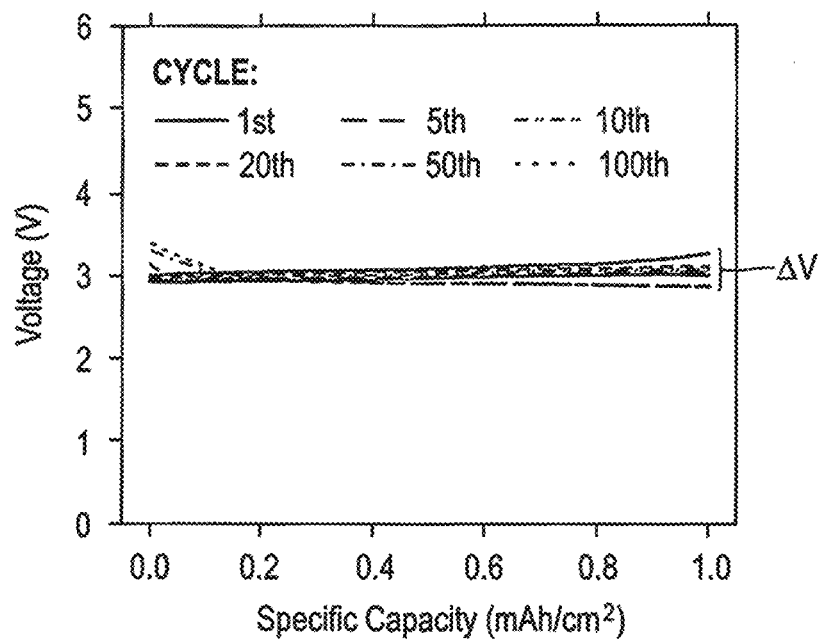
FIG. 16 is a graph illustrating galavanostatic cycling behavior of the battery including an electrolyte with LiI as the metal halide, a 1:1 ratio of MPN and dimethoxyethane (DME) as the solvent including a nitrile, and oxygen as the oxidizing gas at a current density of about 5 mA/cm$^2$.

FIG. 16 is a graph illustrating galavanostatic cycling behavior of the battery including an electrolyte with LiI as the metal halide, a 1:1 ratio of MPN and DME as the solvent including the nitrile compound, and oxygen as the oxidizing gas at a current density of about 5 mA/cm$^2$. The battery was tested with the limited capacity of 1 mAh/cm$^2$ at room temperature. As seen in FIG. 16, the battery including an electrolyte with LiI as the metal halide, a 1:1 ratio of MPN and DME as the solvent including the nitrile compound, and oxygen as the oxidizing gas exhibited good cyclability at the current density of 5 mA/cm$^2$, with only a minor reduction in the voltage efficiency (e.g., less that about 5% reduction in voltage efficiency) for over 500 cycles. Although not shown in FIG. 16, the battery experienced a reduction in voltage efficiency of less than about 10% for over 1,000 cycles. These small reductions in voltage efficiency indicates a high rechargeability of the battery.

Comparative Example 1: Battery with MPN+LiI+Argon Electrolyte

A battery with an electrolyte including LiI as the metal halide and MPN as the solvent including a nitrile compound was fabricated similar to the method as described in Example 1. However, unlike the technique of Example 1, the electrolyte did not include an oxidizing gas, but instead included argon.

Figure 17A:
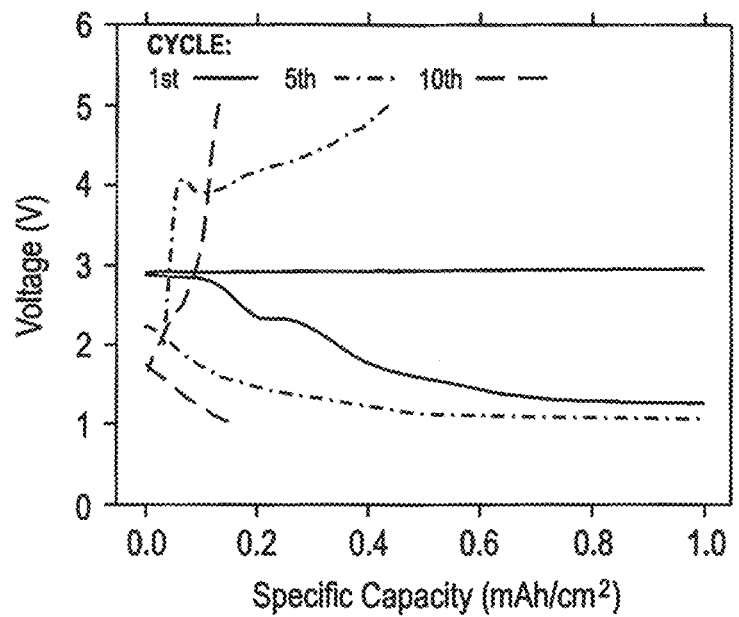
FIG. 17A is a graph illustrating galavanostatic cycling behavior of the battery including an electrolyte with LiI as the metal halide and MPN solvent including a nitrile, without an oxidizing gas at a current density of about 1 mA/cm$^2$.
Figure 17B:
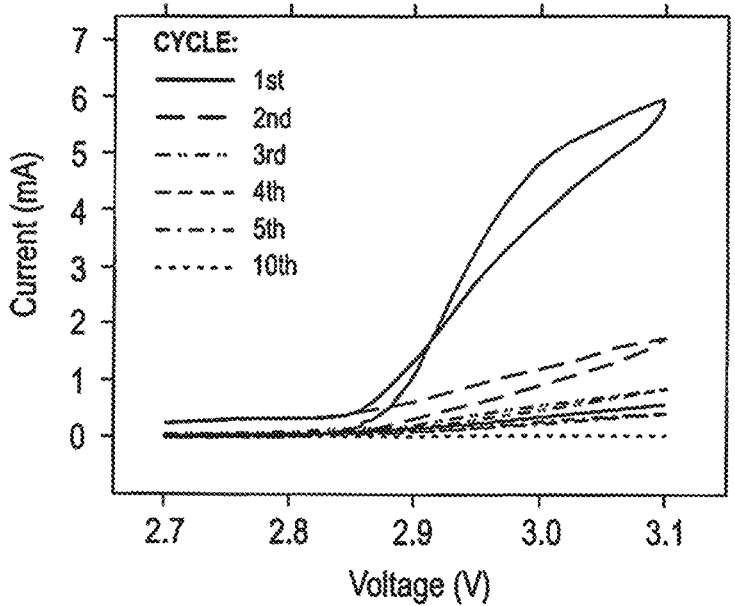
FIG. 17B is a graph illustrating cyclic voltammetry (CV) data of the battery with an electrolyte including LiI as the metal halide and MPN as the solvent including a nitrile, without and oxidizing gas.

FIG. 17A is a graph illustrating galavanostatic cycling behavior of the battery including an electrolyte with LiI as the metal halide and MPN solvent including the nitrile compound, without an oxidizing gas at a current density of about 1 mA/cm$^2$. FIG. 17B is a graph illustrating cyclic voltammetry (CV) data of the battery with an electrolyte including LiI as the metal halide and MPN as the solvent including the nitrile compound, without an oxidizing gas. As seen from FIGS. 17A and 17B, the battery including the electrolyte with a metal halide and a solvent including a nitrile compound, but without an oxidizing gas, exhibited no rechargeability. The result may indicate that the presence of the oxidizing gas is important to the electrochemical performance (e.g., reversibility and rechargeability) of the battery.

Comparative Example 2: Battery with TG+LiTFSI+Oxygen Electrolyte

A battery with an electrolyte including lithium bis(trifluoromethanesulfonyl)imide (LiTFSI) as an electrolyte salt, tetraethylene glycol dimethyl ether (TG) as a solvent, and oxygen as the oxidizing gas was fabricated similar to the method as described in Example 1. However, unlike the technique of Example 1, the electrolyte did not include a metal halide or a solvent including a nitrile compound.

Figure 18A:
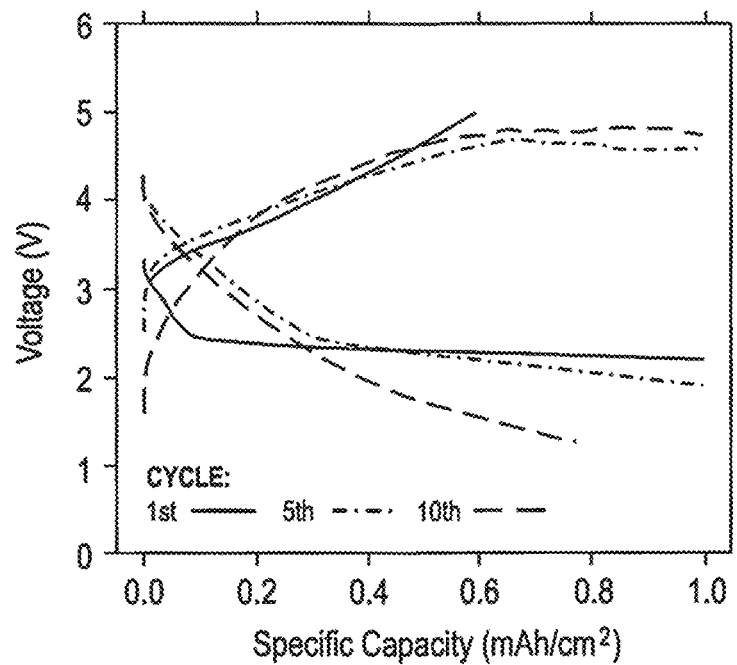
FIG. 18A is a graph illustrating galavanostatic cycling behavior of the battery including an electrolyte with lithium bis(trifluoromethanesulfonyl)imide (LiTFSI) as an electrolyte salt, tetraethylene glycol dimethyl ether (TG) as a solvent, and oxygen as the oxidizing gas at a current density of about 1 mA/cm$^2$.
Figure 18B:
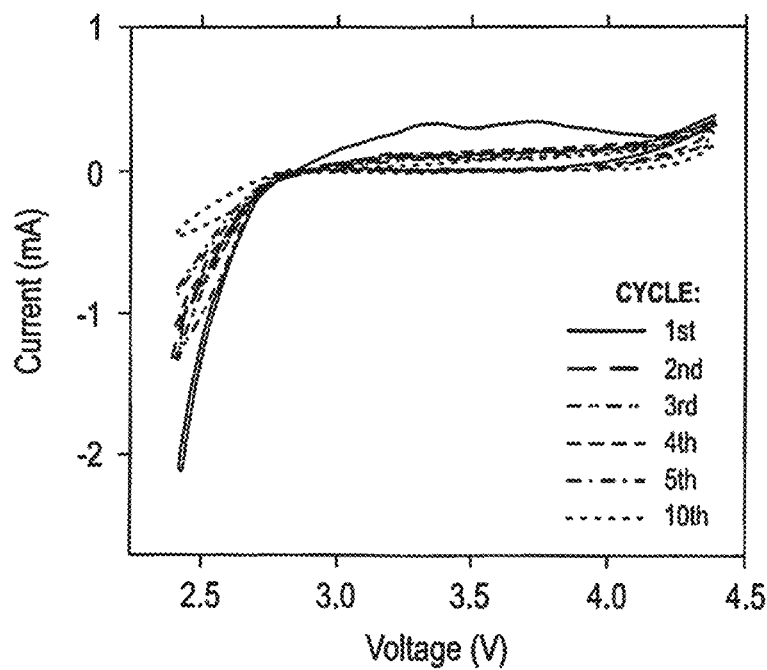
FIG. 18B is a graph illustrating cyclic voltammetry (CV) data of the battery including an electrolyte with LiTFSI as an electrolyte salt, TG as a solvent, and oxygen as the oxidizing gas.

FIG. 18A is a graph illustrating galavanostatic cycling behavior of the battery including an electrolyte with LiTFSI as an electrolyte salt, TG as a solvent, and oxygen as the oxidizing gas at a current density of about 1 mA/cm$^2$. FIG. 18B is a graph illustrating cyclic voltammetry (CV) data of the battery including an electrolyte with LiTFSI as an electrolyte salt, TG as a solvent, and oxygen as the oxidizing gas. The galavanostatic cycling behavior and the CV data of the battery was similar to the galavanostatic cycling behavior and the CV data of some lithium-air batteries. However, the electrochemical performance, e.g., energy efficiency and rechargeability, was lower than that of the battery of Example 2. For example, the battery of Example 2 was able to undergo over 100 charge cycles, whereas the battery including the electrolyte with LiTFSI as the electrolyte salt, TG as the solvent, and oxygen as the oxidizing gas was only able to withstand about 10 cycles before the electrolyte began decomposing.

Figure 18C:
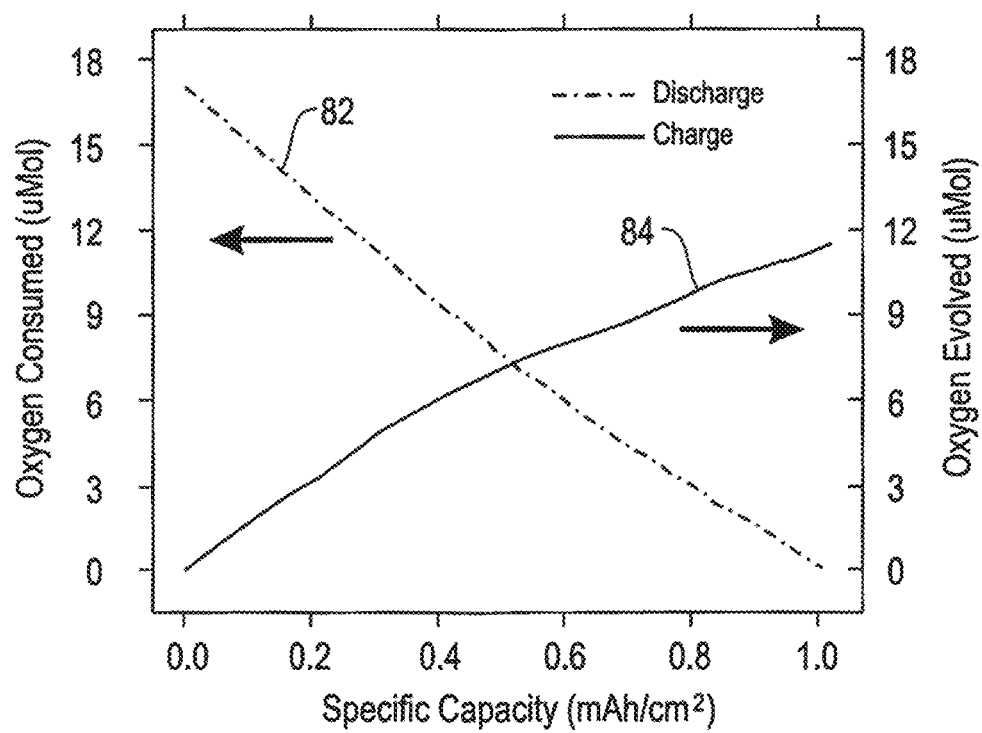
FIG. 18C is a graph illustrating an amount of oxygen consumed and an amount of oxygen evolved during cycling of the battery including an electrolyte with LiTFSI as an electrolyte salt, TG as a solvent, and oxygen as the oxidizing gas.

FIG. 18C is a graph illustrating an amount of oxygen consumed (82) and an amount of oxygen evolved (84) during cycling of the battery including an electrolyte with LiTFSI as an electrolyte salt, TG as a solvent, and oxygen as the oxidizing gas. As seen in FIG. 18C, oxygen is both consumed (82) (e.g., during discharge) and evolved (84) (e.g., during charge). This indicates that the oxygen participates in the redox reactions when the electrolyte does not include the metal halide and the solvent including the nitrile in addition to the oxidizing gas. The decomposition of the electrolyte described with respect to FIG. 18B may be due to parasitic reactions occurring during the consumption (82) and evolution (84) of oxygen, which may be induced by the flow of electrons on the surface of carbon. The parasitic reactions may produce irreversible carbonate byproducts that reduce the cyclability and/or power density of the battery. FIGS. 18A-18C may indicate that the presence of the metal halide and/or the solvent including a nitrile compound is important to the electrochemical performance (e.g., reversibility, rechargeability, and/or cyclability) of the battery.

Comparative Example 3: Battery with
MPN+LiTFSI+Oxygen Electrolyte

A battery with an electrolyte including LiTFSI as an electrolyte salt, MPN as the solvent including a nitrile compound, and oxygen as the oxidizing gas was fabricated similar to the method as described in Example 1. However, unlike the technique of Example 1, the electrolyte did not include a metal halide.

Figure 19A:
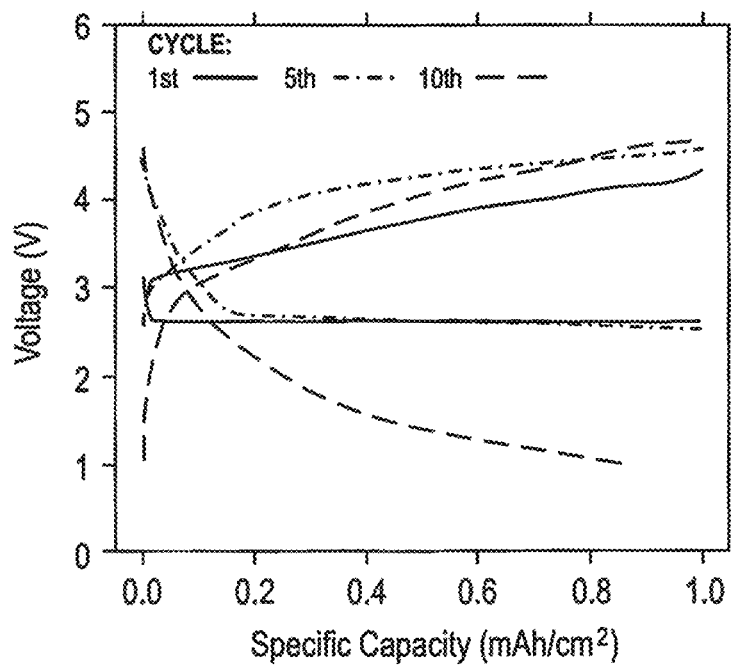
FIG. 19A is a graph illustrating galavanostatic cycling behavior of the battery including LiTFSI as an electrolyte salt, MPN as the solvent including a nitrile, and oxygen as the oxidizing gas at a current density of about 1 mA/cm$^2$.
Figure 19B:
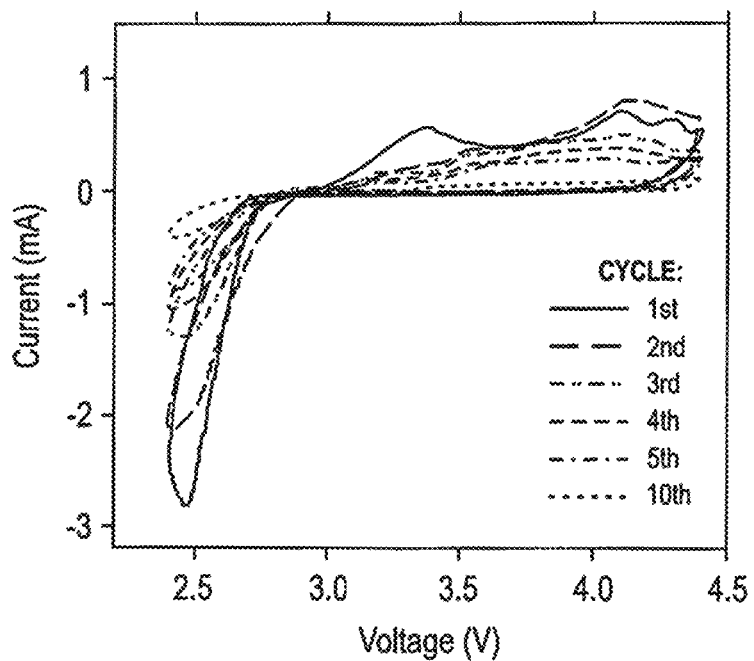
FIG. 19B is a graph illustrating cyclic voltammetry (CV) data of the battery including LiTFSI as an electrolyte salt, MPN as the solvent including a nitrile, and oxygen as the oxidizing gas.

FIG. 19A is a graph illustrating galavanostatic cycling behavior of the battery including LiTFSI as an electrolyte salt, MPN as the solvent including the nitrile compound, and oxygen as the oxidizing gas at a current density of about 1 mA/cm$^2$. FIG. 19B is a graph illustrating cyclic voltammetry (CV) data of the battery including LiTFSI as an electrolyte salt, MPN as the solvent including a nitrile compound, and oxygen as the oxidizing gas. Similar to the battery of Comparative Example 2, the battery including LiTFSI as an electrolyte salt, MPN as the solvent including the nitrile compound, and oxygen as the oxidizing gas exhibited galavanostatic cycling behavior and CV data similar to that of some lithium-air batteries. As with Comparative Example 2, the electrochemical performance in terms of energy efficiency and rechargeability were lower than that of the battery of Example 2, which may be due to decomposition of the electrolyte from parasitic reactions occurring during the consumption and evolution of oxygen. The parasitic reactions may be induced by the flow of electrons on the surface of carbon, and may produce irreversible carbonate byproducts that reduce the cyclability and/or power density of the battery. The electrochemical performance of the battery including LiTFSI as an electrolyte salt, MPN as the solvent including the nitrile compound, and oxygen as the oxidizing gas may indicate that the presence of the metal halide is important to the electrochemical performance (e.g., reversibility, rechargeability, and/or cyclability) of the battery.

Comparative Example 4: Battery with
TG+LiI+Oxygen Electrolyte

A battery with an electrolyte including LiI as the metal halide, TG as a solvent, and oxygen as the oxidizing gas was fabricated similar to the method as described in Example 1. However, unlike the technique of Example 1, the electrolyte did not include a solvent including a nitrile compound.

Figure 20A:
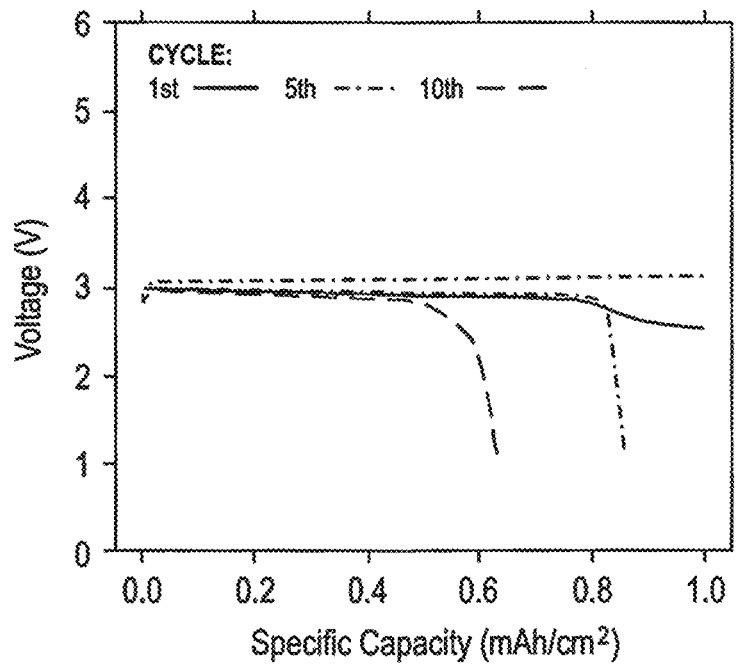
FIG. 20A is a graph illustrating galavanostatic cycling behavior of the battery including LiI as the metal halide, TG as a solvent, and oxygen as the oxidizing gas at a current density of about 1 mA/cm$^2$.
Figure 20B:
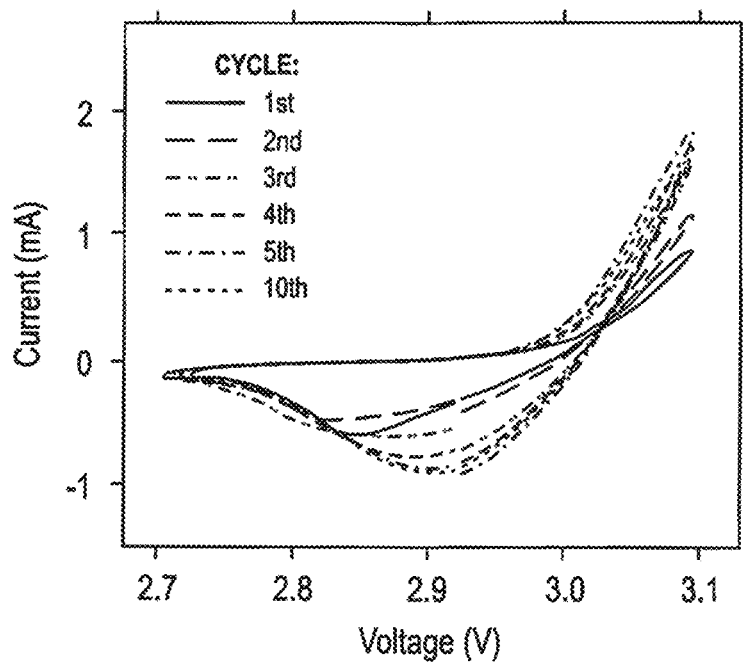
FIG. 20B is a graph illustrating cyclic voltammetry (CV) data of the battery including LiI as the metal halide, TG as a solvent, and oxygen as the oxidizing gas.

FIG. 20A is a graph illustrating galavanostatic cycling behavior of the battery including LiI as the metal halide, TG as a solvent, and oxygen as the oxidizing gas at a current density of about 1 mA/cm$^2$. FIG. 20B is a graph illustrating cyclic voltammetry (CV) data of the battery including LiI as the metal halide, TG as a solvent, and oxygen as the oxidizing gas. As seen in FIGS. 20A and 20B, the battery including LiI as the metal halide, TG as a solvent, and oxygen as the oxidizing gas lasted no more than 10 cycles at the current density of 1 mA/cm$^2$. This may indicate that the presence of the solvent including the nitrile compound in combination with the metal halide and the oxidizing gas is important to the electrochemical performance (e.g., reversibility, rechargeability, and/or cyclability) of the battery.

Figure 21:
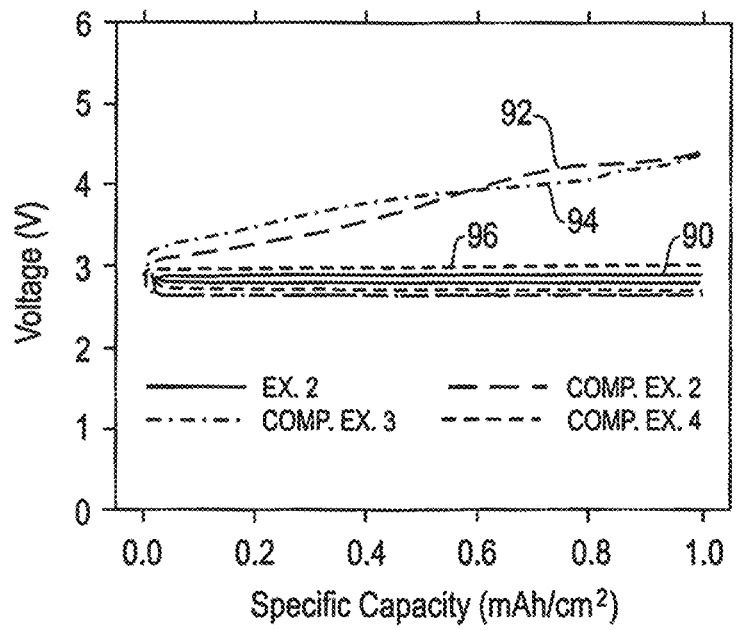
FIG. 21 is a graph illustrating galavanostatic cycling behavior of a first cycle of the batteries of Example 2, Comparative Example 2, Comparative Example 3, and Comparative Example 4 at a current density of about 0.5 mA/cm$^2$.

FIG. 21 is a graph illustrating galavanostatic cycling behavior of a first charge and discharge cycle of the batteries of Example 2 (90), Comparative Example 2 (92), Comparative Example 3 (94), and Comparative Example 4 (96) at a current density of about 0.5 mA/cm$^2$. The batteries were tested with a limited capacity of 1 mAh/cm$^2$ at room temperature. As seen in FIG. 21, the battery of Example 2 (90) exhibited the highest energy efficiency (e.g., smallest voltage gap) in comparison to Comparative Example 2 (92), Comparative Example 3 (94), and Comparative Example 4 (96). The battery of Example 2 (90) had the smallest reduction in voltage efficiency over the first cycle. For example, the battery of Example 2 (90) exhibited a voltage gap of about 0.05 V, which resulted in an energy efficiency of greater than 95%. In contrast, the batteries of Comparative Example 2 (92) and Comparative Example 3 (93) each exhibited a voltage gap of about 1.3 V, which resulted in an energy efficiency of about 68%. This indicates that the electrolyte including the metal halide, the solvent including a nitrile compound, and the oxidizing gas may exhibit improved electrochemical performance in comparison to an electrolyte not including at least one of the metal halide, the solvent including a nitrile compound, and the oxidizing gas.

Figure 22:
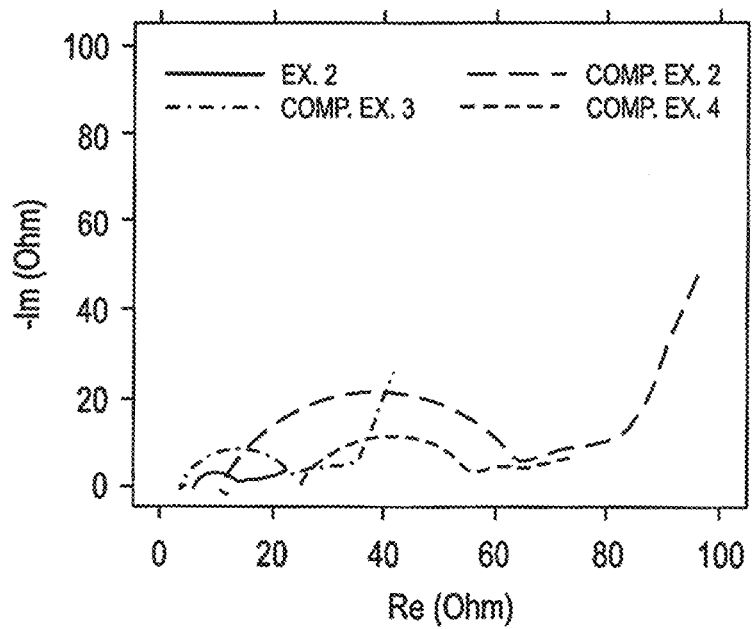
FIG. 22 is a graph illustrating electrochemical impedance spectra of the batteries of Example 2, Comparative Example 2, Comparative Example 3, and Comparative Example 4.

FIG. 22 is a graph illustrating electrochemical impedance spectra of the batteries of Example 2 (90), Comparative Example 2 (92), Comparative Example 3 (94), and Comparative Example 4 (96). As seen in FIG. 22, the battery of Example 2 (90) exhibited the smallest electrochemical impedance in comparison to Comparative Example 2 (92), Comparative Example 3 (94), and Comparative Example 4 (96), which may indicate improved charge transfer kinetics relative to Comparative Example 2 (92), Comparative Example 3 (94), and/or Comparative Example 4 (96). The charge transfer kinetics may have been improved due to improvement of redox reactions and diffusion of the reactants (e.g., iodide, triiodide, Li ions) both toward and away from the electrodes of the battery.

Various examples have been described. These and other examples are within the scope of the following claims.

What is claimed is:

1. A battery, comprising:
   an anode;
   an electrolyte comprising,
     an oxidizing gas,
     a metal halide as an active cathode material, and
     a solvent comprising a nitrile compound, wherein the oxidizing gas and the metal halide are dissolved in the solvent and the electrolyte is in contact with the anode; and
   a current collector in contact with the active cathode material.

2. The battery of claim 1, wherein the current collector comprises a porous material that is electrically conductive.

3. The battery of claim 1, comprising a separator between the anode and the current collector.

4. The battery of claim 1, wherein the battery completes at least 100 cycles of charging and discharging at a current density of greater than or equal to 1 mA/cm$^2$.

5. The battery of claim 1, wherein the battery completes at least 1000 cycles of charging and discharging at a current density of greater than or equal to 1 mA/cm$^2$.

6. The battery of claim 1, wherein the battery completes at least 100 cycles of charging and discharging at a current density of greater than or equal to 20 mA/cm$^2$.

7. The battery of claim 1, wherein the battery completes at least 1000 cycles of charging and discharging at a current density of greater than or equal to 20 mA/cm$^2$.

8. The battery of claim 1, wherein the battery has an energy efficiency of greater than or equal to 90% at a current density of greater than or equal to 1 mA/cm$^2$.

9. The battery of claim 1, wherein the battery has an energy efficiency of greater than or equal to 99% at a current density of greater than or equal to 1 mA/cm$^2$.

10. The battery of claim 1, wherein the battery has an energy efficiency of greater than or equal to 90% at a current density of greater than or equal to 20 mA/cm$^2$.

11. The battery of claim 1, wherein the battery has an energy efficiency of greater than or equal to 99% at a current density of greater than or equal to 20 mA/cm$^2$.

12. The battery of claim 1, wherein the anode comprises at least one of Li, Mg, and Na.

13. The battery of claim 1, wherein the oxidizing gas comprises at least one of oxygen, air, nitric oxide, and nitrogen dioxide.

14. The battery of claim 1, wherein the solvent comprises at least one of valeronitrile, nonanenitrile, hexanenitrile, acetonitrile, propionitrile, glutaronitrile, methoxyacetonitrile, methoxybenzonitrile, methoxypropionitrile, methylglutaronitrile, butoxypropionitrile, and butoxybenzonitrile.

15. The battery of claim 1, wherein the metal halide comprises an electrolyte salt that dissociates into a respective halide ion and a respective metal ion in the solvent, and wherein the halide ion comprises an ion of at least one of I, Br, Cl, and F, and the metal ion comprises an ion of at least one of Li, Mg, and Na.

16. The battery of claim 1, wherein the solvent comprises an organic solvent selected from the group consisting of an ether, a glyme, a carbonate, a nitrile, an amide, an amine, an organosulfur solvent, an organophosphorus solvent, an organosilicon solvent, a fluorinated solvent, and mixtures and combinations thereof.

17. The battery of claim 1, comprising a second cathode material in addition to the metal halide that functions as the active cathode material.

18. A method of forming the battery of claim 1, comprising:
   dissolving a metal halide in a solvent comprising a nitrile to form a solution;
   soaking a separator with the solution;
   stacking an anode, the separator soaked with the solution, and a current collector, wherein the stacking comprises placing the separator between the anode and the current collector; and
   introducing an oxidizing gas to the stacked anode, separator, and current collector to form the battery.

19. The battery of claim 1, wherein the battery does not include a dedicated cathode material.

20. The battery of claim 1, wherein the metal halide receives, stores, and releases metal ions during charging and discharging of the battery and the current collector collects electrons during discharge of the battery.

* * * * *